(12) United States Patent
Pogde et al.

(10) Patent No.: US 12,373,462 B2
(45) Date of Patent: Jul. 29, 2025

(54) METHODS AND APPARATUS TO ORGANIZE AN OBJECT STORE NAMESPACE

(71) Applicant: Cloudera, Inc., Santa Clara, CA (US)

(72) Inventors: Prashant Pogde, Sunnyvale, CA (US); Siddharth Jivan Wagle, Saratoga, CA (US); Uma Maheswara Rao Gangumalla, Milpitas, CA (US); Arpit Ashok Agarwal, Sunnyvale, CA (US)

(73) Assignee: Cloudera, Inc., Santa Clara, CA (US)

(*) Notice: Subject to any disclaimer, the term of this patent is extended or adjusted under 35 U.S.C. 154(b) by 0 days.

(21) Appl. No.: 18/535,818

(22) Filed: Dec. 11, 2023

(65) Prior Publication Data

US 2025/0117397 A1 Apr. 10, 2025

Related U.S. Application Data

(60) Provisional application No. 63/588,249, filed on Oct. 5, 2023.

(51) Int. Cl.
*G06F 16/27* (2019.01)
(52) U.S. Cl.
CPC .................................. *G06F 16/27* (2019.01)
(58) Field of Classification Search
CPC ....................................................... G06F 16/27
See application file for complete search history.

(56) References Cited

U.S. PATENT DOCUMENTS

| 11,144,510 | B2* | 10/2021 | Sharma | G06F 16/178 |
| 11,194,763 | B1* | 12/2021 | Grider | G06F 16/2246 |
| 11,853,263 | B2* | 12/2023 | Shvachko | H04L 67/1095 |
| 2013/0218934 | A1* | 8/2013 | Lin | G06F 16/182 |
| | | | | 707/828 |
| 2018/0246916 | A1* | 8/2018 | Fathalla | G06F 16/86 |
| 2018/0260409 | A1* | 9/2018 | Sundar | G06F 16/13 |

OTHER PUBLICATIONS

Apache, "[RATIS 1557] Support Linearizable Read from Followers," Mar. 21, 2022, retrieved from <https://issues.apache.org/jira/si/jira.issueviews:issue-html/RATIS-1557/RATIS-1557.html> on Dec. 8, 2023, 4 pages.
Apache Software Foundation,"Apache Ozone," published on Aug. 23, 2023, retrieved from <https://web.archive.org/web/20230823034522/http://apache.org/> on Dec. 11, 2023, 3 pages.
Apache Software Foundation, "Apache Ratis," published on Aug. 23, 2023, retrieved from <https://web.archive.org/web/20230823034538/http://apache.org/> on Dec. 11, 2023, 5 pages.

(Continued)

*Primary Examiner* — Dangelino N Gortayo
(74) *Attorney, Agent, or Firm* — Hanley, Flight & Zimmerman, LLC

(57) ABSTRACT

Disclosed examples create at least first and second database shards in a leader node, the leader node located in a consensus ring; and cause replication of first namespace metadata in the at least the first and second database shards of the leader node and in at least first and second database shards in a follower node, the follower node located in the consensus ring.

23 Claims, 11 Drawing Sheets

(56) References Cited

OTHER PUBLICATIONS

Apache, "Documentation for Apache Hadoop Ozone," published on Mar. 24, 2023, retrieved from <https://web.archive.org/web/20230324054301/https://ozone.apache.org/docs/1.0.0/concept/ozonemanager.html> on Dec. 11, 2023, 4 pages.

Apache, "Documentation for Apache Hadoop Ozone," retrieved from <https://ozone.apache.org/docs/1.0.0/concept/ozonemanager.html> on Dec. 8, 2023, 5 pages. (Included to show figure labeled 'Key Reads' that is missing from NPL4 copy.).

Github, "The Raft Consensus Algorithm," published on Sep. 27, 2023, retrieved from <https://web.archive.org/web/20230927155628/https://raft.github.io/> on Dec. 11, 2023, 14 pages.

Ongaro et al., "In Search of an Understandable Consensus Algorithm (Extended Version)," May 20, 2014, 18 pages.

Rocksdb, "A Persistent Key-Value Store," Meta Open Source, 2022, retrieved from <https://rocksdb.org> on Dec. 8, 2023, 6 pages.

Scylladb, "Paxos Consensus Algorithm," published on May 31, 2023, retrieved from <https://www.scylladb.com/glossary/paxos-consensus-algorithm/> on Dec. 11, 2023, 7 pages.

\* cited by examiner

METHODS AND APPARATUS TO ORGANIZE AN OBJECT STORE NAMESPACE

RELATED APPLICATIONS

This patent arises from a patent application that claims the benefit of U.S. Provisional Patent Application No. 63/588,249, which was filed on Oct. 5, 2023, and is entitled "Methods and Apparatus to Organize an Object Store Namespace." U.S. Provisional Patent Application No. 63/588,249 is hereby incorporated herein by reference in its entirety.

FIELD OF THE DISCLOSURE

This disclosure relates generally to distributed computing and, more particularly, to methods and apparatus to organize an object store namespace.

BACKGROUND

Computer storage systems store information in storage devices. The information is organized in a manner that allows finding the information for subsequent access. A namespace can be used to track the organization of such information, which may include data files, executable files, directories/folder, resources, etc. When information is created, added, moved, or deleted, a namespace can be updated to track the existence and/or location of such information.

BRIEF DESCRIPTION OF THE DRAWINGS

In general, the same reference numbers will be used throughout the drawing(s) and accompanying written description to refer to the same or like parts. The figures are not necessarily to scale.

DETAILED DESCRIPTION

Figure 1:
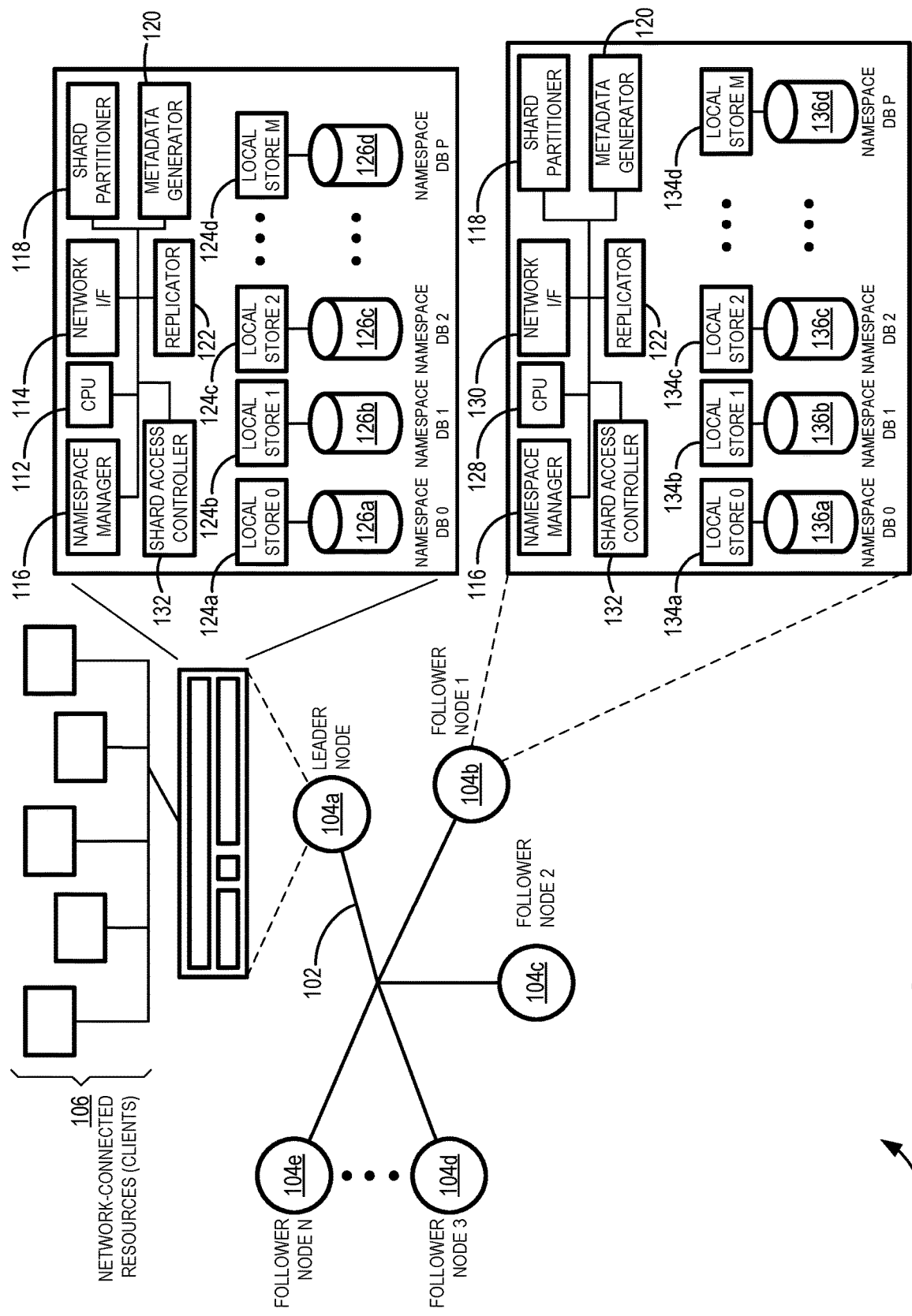
FIG. 1 is a block diagram of an example distributed storage system environment in which an example namespace management cluster of nodes operates to implement an object store namespace.

Examples disclosed herein may be used to organize a distributed object store namespace metadata across multiple nodes of a cluster based on multiple intra-node shards (e.g., multiple shards in a node) and corresponding namespace databases. Examples disclosed herein may be used to scale such a distributed object store namespace metadata corresponding to large quantities of objects (e.g., billions of objects) while preserving cluster-wide strong consistency guarantees for the entire namespace. Examples disclosed herein may be applied to object key-container managers (e.g., Apache Ozone Manager provided by the Apache Software Foundation) that manage storage of object namespace metadata across containers, storage container managers that manage storage of container namespace metadata across physical storage nodes, or any other manager that manages namespace metadata.

In a computing environment, an object store namespace is used to organize and maintain object identifiers (e.g., object names) in that computing environment so that different ones of the objects can be assigned unique identifiers to store, provision, and/or access the different objects in the computing environment. A unique identifier per object in an object store namespace ensures that each object can be instantiated, selected, allocated, accessed, modified, deleted, copied, moved, etc. exclusive of other objects in the same object store namespace. For example, if an object store namespace corresponds to a single computer, a unique identifier for each file (e.g., an object) in that computer allows a file to be opened, modified, moved, deleted, etc. exclusive of other files in the computer. Although two different files in a computer may have the same name, they have unique namespace identifiers according to their locations in different directories. For example, two files can be named identically as Reports.txt so long as their locations in a file structure correspond to two different directory paths (e.g., two different file namespaces). A first directory path could be " . . . \Documents\Reports.txt", where "Documents" is the directory (or folder) containing the first Reports.txt file. A second directory path could be " . . . \Temp\Reports.txt", where "Temp" is the directory (or folder) containing the second Reports.txt file. In such an example, the object store namespace used to distinguish between the two Reports.txt files corresponds to a computer's file structure.

In a network environment, an object store namespace (e.g., a network namespace of a corresponding network) includes unique object identifiers (e.g., object names) for multiple files, directories, resources (e.g., objects) in that network environment. For example, a unique object identifier allows a resource to be provisioned, allocated, accessed, de-provisioned, etc. exclusive of other resources in the network environment. Although two different resources in a network environment may have the same name, they have unique namespace object identifiers according to their locations in different networks or subnets. For example, two resources can be named identically as Printer_001 as long as their locations in a network structure correspond to two different namespaces. In a first network namespace "ns1", a resource path could be " . . . \ns1\Printer_001" for the first printer object named Printer_001. In a second network namespace "ns2", a resource path could be " . . . \ns2\Printer_001" for the second printer object named Printer_001. In such an example, the network namespaces used to distinguish between the two printers identically named Printer_001 are based on their two separate network namespaces, "ns1" and "ns2". Such network namespaces may also be used to manage file identities across multiple network-connected computers, data stores, etc.

Object store namespace metadata can be managed using a consensus ring of clustered compute nodes to replicate namespace metadata across the multiple nodes. In this manner, a namespace management cluster of multiple nodes provides a highly available, fault-tolerant solution to make namespace metadata consistently available to client devices that rely on such namespace metadata to access files, hardware, software, resources, and/or other objects across a network. When namespace metadata is updated at a leader node in a node cluster, the leader node propagates the updates to the follower nodes in the same namespace management cluster. In this manner, all nodes of the same namespace management cluster contain the same namespace metadata so that such namespace metadata can be accessed by client devices, even when one or more nodes of the namespace management cluster have failed or are inaccessible.

To manage namespaces of ever-growing resource environments, whether corresponding resources be files, databases, software, physical resources, virtual resources, etc., examples disclosed herein use an intra-node sharding technique. To implement intra-node sharding, examples disclosed herein configure a node to include multiple namespace databases to store corresponding shards of namespace metadata. In a namespace management cluster, the same namespace metadata is replicated across shards of multiple nodes of that cluster to provide high-availability and consistency of the namespace metadata. When a leader node of the namespace management cluster detects a request from a client device to update namespace metadata in one or more of its local namespace databases, the leader node causes replication of the update(s) to its local namespace databases and corresponding local namespace databases of its follower nodes of the namespace management cluster. In addition, when a number of object names fills the storage capacity of existing shards representing a namespace and new objects are added to the namespace, examples disclosed herein accommodate additional namespace metadata for such object additions by adding one or more shards in each node of a namespace management cluster. In this manner, examples disclosed herein may be used to scale a distributed object store namespace to large quantities of objects (e.g., billions of objects) while preserving strong cluster-wide consistency guarantees for the entire namespace.

FIG. 1 is a block diagram of an example distributed storage system environment 100 in which an example namespace management cluster consensus ring 102 (e.g., the cluster consensus ring 102) of nodes 104a-e operates to store object store namespace metadata. In example FIG. 1, a leader node 104a of the cluster consensus ring 102 is in communication with four follower nodes 104b-e. However, in other examples, the cluster consensus ring 102 may include fewer or more nodes and, thus, fewer or more follower nodes. In any case, the number "N" of nodes in a consensus ring allows for N-way replication of namespace metadata in the N nodes so that every node stores the same namespace metadata. In this manner, even when some nodes in the consensus ring 102 fail, the consensus ring 102 provides fault tolerance and high-availability of the namespace metadata based on its other nodes that remain functional and accessible. The example cluster consensus ring 102 is in communication with network-connected resources 106, also referred to as client devices 106. The example client devices 106 access object store namespace metadata in the example cluster consensus ring 102. For example, the client devices 106 may access object store namespace metadata to add object names, update object names, delete object names, etc. and/or to retrieve paths/locations of objects in a network environment.

The example leader node 104a includes a central processing unit (CPU) (e.g., a processor) 112, a network interface 114, a namespace manager 116, a shard partitioner 118, a metadata generator 120, a replicator 122, and a shard access controller 132. Although shown separately, in some examples, one or more of the shard partitioner 118, the metadata generator 120, the replicator 122, and/or the shard access controller 132 may be implemented in the namespace manager 116. The example leader node 104a also includes local data stores 124a-d and namespace databases 126a-d. The example first follower node 104b includes a CPU 128, a network interface 130, a namespace manager 116, a shard partitioner 118, a metadata generator 120, a replicator 122, a shard access controller 132, local data stores 134a-d, and namespace databases 136a-d.

The example local data stores 124a-d, 134a-d may be implemented using nonvolatile memory express (NVMe) storage devices, solid state drives, and/or any other suitable memory. The example namespace databases 126a-d, 136a-d store object store namespace metadata in accordance with teachings of this disclosure. Although not all are shown in detail, the other follower nodes 104c-104e are substantially similar or identical to the first follower node 104b. The example nodes 104a-e may be implemented using servers or computers (e.g., compute nodes) in communication via a network. In some examples, the nodes 104a-e are servers in one or more physical racks of a datacenter. In some examples, the nodes 104a-e are virtual machines (VMs) instantiated on one or more server hosts in one or more physical racks of a datacenter. In other examples, the nodes 104a-e are containers instantiated on one or more server hosts in one or more physical racks of a datacenter. For example, the containers may be instantiated and/or managed as Kubernetes® containers.

The example namespace databases 126a-d, 136a-d may be implemented using RocksDB (provided by Meta Platforms, Inc.) for durable storage or any other suitable type of database (e.g., a Structured Query Language (SQL) database, a MySQL database, an embedded SQL database, an Apache Cassandra database, etc.). Unlike prior solutions that use only a single namespace database per node to store namespace metadata, example FIG. 1 includes the multiple namespace databases 126*a-d* in the leader node 104*a* and the multiple namespace databases 136*a-d* in the follower node 104*b* (and in the other follower nodes 104*c-e*). Although example FIG. 1 shows multiple local data stores 124*a-d* of the leader node 104*a* to store corresponding ones of the multiple namespace databases 126*a-d*, and the multiple local data stores 134*a-d* of the follower node 104*b* to store corresponding ones of the multiple namespace databases 136*a-d*, in other examples, the nodes 104*a-e* may include fewer local data stores (or one local data store) to store multiple local namespace databases. That is, the number of local data stores need not match the number of namespace databases as a one-to-one arrangement. Instead, the number 'M' of local data stores to provide per node may be selected based on a target data access performance. For example, if a local data store is implemented using an NVMe device having a 3 gigabyte (GB) per second read/write speed, this may be sufficient to host 10 namespace databases while satisfying a target data access performance based on a desired or target number of input/output operations per second (IOPS). Under such an example, if a scaling target is to accommodate 30 namespace databases, three NVMe devices to implement three local data stores (e.g., M=3) may be provided per node 104*a-e*. In some examples, the number 'M' of local data stores may be dynamically increased or decreased from time to time by provisioning or de-provisioning data store resources in the nodes 104*a-e*. For example, data store resources (e.g., the local data stores 124*a-d*, 136*a-d*) may be provided in drawers of a physical rack in a data center, and such data store resources may be allocated to the nodes 104*a-e* as needed when scaling to accommodate a larger object store namespace in accordance with teachings of this disclosure. In addition, adding local data stores scales up the number of IOPS achievable for a consensus ring. In some examples, the addition of local data stores to scale up an object store namespace capacity in a consensus ring has the additional benefit of scaling up the IOPS of the consensus ring. In other examples, scaling up the IOPS of the consensus ring may be a driving factor in adding local data stores.

As described below in connection with FIG. 3, examples disclosed herein shard namespace metadata into multiple shards per node 104*a-e*, and each of the namespace databases 126*a-d*, 136*a-d* stores a corresponding shard of the namespace metadata. Although only four namespace databases 126*a-d*, 136*a-d* are shown per node in FIG. 1, using such multiple namespace databases per node in accordance with examples disclosed herein enables expanding, or scaling, the quantity of corresponding namespace databases to any suitable number 'P' to store namespace metadata for expanding numbers of objects in a computing/network environment. In this manner, examples disclosed herein may be used to scale object store namespaces to substantially large numbers of namespace metadata values in a more time-efficient manner than prior art solutions for storing object store namespace metadata. That is, when the instantiated namespace databases in the nodes 104*a-e* are full, the leader node 104*a* can instantiate a new namespace database in one of the local data stores 124*a-d* and instruct the follower nodes 104*b-e* to also instantiate additional respective namespace databases in their local data stores to accommodate more namespace metadata. For example, if a single shard can handle namespace metadata for 10 billion objects, implementing 10 shards per node accommodates namespace metadata for 100 billion objects across all 10 shards in a node.

Examples disclosed herein also enable optimizing the number of namespace databases 126*a-d*, 136*a-d* (e.g., shards or database shards) per node 104*a-e* based on incoming throughput (e.g., IOPS). That is, since namespace metadata is written to a number "P" of namespace databases based on the lead node 104*a* sending transaction commands to command logs at the namespace databases 126*a-d*, 136*a-d*, the transaction commands are being drained from corresponding command logs at each namespace database 126*a-d*, 136*a-d* concurrently as the namespace data is written/committed in the namespace databases 126*a-d*, 136*a-d*. As such, examples disclosed herein enable matching the number of namespace databases 126*a-d*, 136*a-d* (e.g., shards) per node 104*a-d* to the incoming throughput of transactions in terms of IOPS. For example, if the incoming throughput of namespace operations from the client devices 106 is 3 million IOPS, and one namespace database instance can drain 100,000 IOPS, then 30 different namespace databases (e.g., shards) can be instantiated per node 104*a-e*. Therefore, examples disclosed herein enable scaling an object store namespace based on different aspects (e.g., a number of objects, incoming namespace operations throughput, throughput performance of a consensus ring, etc.) to make namespace metadata consistent and highly available in a cloud computing environment even through re-sizing of such namespace metadata over time.

The example cluster consensus ring 102 may be implemented using any suitable consensus ring protocol. Example consensus ring protocols that may be used include the RAFT consensus protocol and the Paxos consensus protocol. An example of the RAFT consensus protocol is Apache Ratis provided by The Apache Software Foundation.

In a consensus protocol, multiple nodes (e.g., the nodes 104*a-e* of FIGS. 1 and 3) in a cluster consensus ring work together to store the same agreed upon data. Since the same data or values are replicated across the multiple nodes of the consensus ring, the consensus ring can continue operating to provide access to those values even if some of the nodes in the cluster consensus ring fail. In examples disclosed herein, the cluster consensus ring 102 is used to replicate namespace metadata across the multiple nodes 104*a-e*. When client devices (e.g., the network connected resources or clients 106 of FIG. 1) access the namespace metadata in the cluster consensus ring 102, the client devices believe they are interacting with a single node. In this manner, even if one or multiple nodes of the cluster consensus ring 102 fail(s), the cluster consensus ring 102 still appears as a single node to client devices. In operation, the nodes 104*a-e* of the consensus ring 102 perform a voting procedure to determine a leader at different points in time. For example, one of the nodes 104*a-e* may begin the voting process when that one of the nodes 104*a-e* has new data or updated data to replicate across the nodes 104*a-e*. For example, the new data or updated data may be obtained from namespace operations received from one or more client devices 106 during a client request phase. When all of the nodes 104*a-e* agree on a leader node, the other ones of the nodes 104*a-e* take on rolls of follower nodes. The leader node 104*a* then transmits commands during an apply transaction phase to apply transactions of data in its namespace databases 126*a-d* and namespace databases 136*a-d* of the follower nodes 104*b-e* to build a replication of the data in the leader node 104*a* and the follower nodes 104*b-e*. To apply transaction commands, the transaction commands are written to a command log in each of the nodes 104a-e, and the nodes 104a-e execute the transaction commands from their command logs until the commands have been drained (e.g., no commands remain) from their corresponding command logs. In this manner, each node 104a-e processes the same series of commands, thereby committing the same stored namespace metadata in the multiple nodes 104a-e. In example FIG. 1, the executions of the transaction commands are performed atomically cluster-wide across the nodes 104a-e so that namespace updates are performed through completion in all of the nodes 104a-e or are not committed at all. In this manner, namespace updates are not inadvertently applied partially which could compromise the accuracy of the namespace. In addition, in the event of a failed commit of the namespace updates, transaction command replays are idempotent so that retrying the namespace updates across the nodes 104a-e will not result in compounding multiple ones of the same changes but instead will result in updating the namespace information as if the transaction commands were applied only once.

Since the roles of the nodes 104a-e of FIG. 1 can switch between leader and follower from time to time, at some later time, any of the other nodes 104b-e may be the leader node and remaining ones of the nodes 104a-e may be follower nodes. As such, the components of the leader node 104a shown in FIG. 1 as the namespace manager 116, the shard partitioner 118, the metadata generator 120, the replicator 122, and the shard access controller 132 are also instantiated in the follower nodes 104b-e of FIG. 1.

The example CPU 112 and the example CPU 128 are provided in corresponding ones of the nodes 104a-e to execute machine executable instructions to implement a consensus ring, to read/write namespace metadata, to serve the namespace metadata to requesting clients (e.g., the client devices 106), and/or to perform any other operations disclosed herein to implement sharding-based storage of object store namespaces. Although shown separately, in some examples, the CPU 112 of the leader node 104a may be configured to implement one or more of the namespace manager 116, the shard partitioner 118, the metadata generator 120, the replicator 122, and/or the shard access controller 132. In addition, the CPU 128 of the follower node 104b may be configured to implement one or more of the namespace manager 116, the shard partitioner 118, the metadata generator 120, the replicator 122, and/or the shard access controller 132.

In example FIG. 1, the network interfaces 114, 130 are provided to facilitate communications between the nodes 104a-e and to facilitate communications between the nodes 104a-e and the client devices 106. The example namespace manager 116 is provided to maintain a map that maps namespace metadata to corresponding ones of the namespace databases 126a-d, 136a-d. The example namespace manager 116 also manages when to scale the number of namespace databases 126a-d, 136a-d in the nodes based on the capacities of the namespace databases 126a-d, 136a-d and the amount of stored namespace metadata. The example namespace manager 116 may be implemented using any suitable namespace manager. For example, techniques disclosed herein may be adapted for use in an OzoneManager component of Apache Ozone, which is an n-way replicated, distributed, and secure object store available through The Apache Software Foundation. In some examples, the example namespace manager 116 is instantiated by programmable circuitry executing example namespace manager instructions and/or configured to perform operations such as those represented by the flowcharts of FIGS. 5A, 5B, and/or 5C.

The example shard partitioner 118 is provided to create shards and partition namespace metadata into multiple shards using scope-aware sharding. For example, upon initialization of an object store namespace, the shard partitioner 118 may partition the initial namespace metadata into multiple partitions to store across multiple shards. In examples disclosed herein, an example sharding strategy is to either use a consistent hashing scheme or maintain a mapping of different shards and their corresponding directory location in master shards (e.g., the master shards 304a, 306a, 308a of FIG. 3). The example shard partitioner 118 may implement scope-aware sharding at any suitable hierarchy level of a namespace tree (e.g., the example namespace tree 200 of FIG. 2). In some examples, the shard partitioner 118 partitions the namespace metadata at the volume level. For example, different shards store respective volumes of namespace data (e.g., shard 1 stores "/V1" namespace data, shard 2 stores "/V2" namespace data, shard 3 stores "/V3" namespace data, etc.) of namespace metadata. In other examples, the shard partitioner 118 partitions the namespace metadata at the bucket level. For example, different shards store respective buckets of namespace data (e.g., shard 1 stores "/V2/B1" namespace data, shard 2 stores "/V2/B2" namespace data, shard 3 stores "/V2/B3" namespace data, etc.). In yet other examples, the shard partitioner 118 may use any other suitable scope-aware sharding. In some examples, the example shard partitioner 118 is instantiated by programmable circuitry executing example shard partitioner instructions and/or configured to perform operations such as those represented by the flowcharts of FIGS. 5A, 5B, and/or 5C.

The example metadata generator 120 is provided to generate namespace metadata and cross-shard metadata. Namespace metadata values are specific to particular objects represented in a namespace. Cross-shard metadata is applicable to how namespace metadata is organized across database shards in the nodes of a cluster consensus ring. For example, cross-shard metadata defines how the namespace metadata values are partitioned (e.g., partitioned in accordance with scope-aware sharding at suitable levels such as volume-level sharding, bucket-level sharding, etc.) and stored across multiple database shards in the namespace databases 126a-d, 136a-d. In some examples, the metadata generator 120 generates a cross-shard metadata map in which namespace metadata is mapped to shards in corresponding ones of the namespace databases 126a-d, 136a-d. For example, cross-shard metadata generated by the metadata generator 120 includes volume information (e.g., VolumeInfo) that identifies different buckets under a volume in corresponding database shards. As such, accessing particular namespace metadata of interest in different buckets under a volume can be done by referencing the volume information in the cross-shard metadata of the master shards (e.g., the master shards 304a, 306a, 308a of FIG. 3) to access the corresponding database shard(s) in which the namespace metadata of interest is stored. Other data-indexing, cross-shard metadata may additionally or alternatively be generated by the metadata generator 120 and stored in master shards (e.g., the master shards 304a, 306a, 308a). In example FIG. 1, the leader node 104a replicates the cross-shard metadata by storing the cross-shard metadata in a master shard (e.g., the master shard 304a of FIG. 3) of the leader node 104a and causing storage of the cross-shard metadata in master shards (e.g., the master shards 306a, 308a of FIG. 3) of the follower nodes 104b-e. In some examples, the example metadata generator 120 is instantiated by programmable circuitry executing example metadata generator instructions and/or configured to perform operations such as those represented by the flowcharts of FIGS. 5A, 5B, and/or 5C.

The example replicator 122 is provided to replicate namespace metadata across the leader node 104a and the follower nodes 104b-e. For example, when the replicator 122 detects that a namespace change has been requested by a client device 106 to add, modify, delete, etc. namespace metadata, the replicator 122 executes one or more operations to apply transactions as described below in connection with FIGS. 3 and 4 to commit the namespace changes to the leader node 104a and the follower nodes 104b-e. In some examples, the example replicator 122 is instantiated by programmable circuitry executing the example replicator instructions and/or configured to perform operations such as those represented by the flowcharts of FIGS. 5A, 5B, and/or 5C.

The example shard access controller 132 is provided to access (e.g., write, modify, read, etc.) cross-shard metadata and/or namespace metadata in the namespace databases 126a-d, 136a-d of the nodes 104a-e. For example, the shard access controller 132 may update metadata in the namespace databases 126a-d, 136a-d based on transaction commands in command logs of the nodes 104a-e. In some examples, the example shard access controller 132 is instantiated by programmable circuitry executing example shard access controller instructions and/or configured to perform operations such as those represented by the flowcharts of FIGS. 5A, 5B, and/or 5C.

The example network interface 114, the example namespace manager 116, the example shard partitioner 118, the example metadata generator 120, the example replicator 122, and/or the example shard access controller 132 of FIG. 1 may be instantiated (e.g., creating an instance of, bring into being for any length of time, materialize, implement, etc.) by programmable circuitry such as a Central Processor Unit (CPU) executing first instructions. Additionally or alternatively, the example network interface 114, the example namespace manager 116, the example shard partitioner 118, the example metadata generator 120, the example replicator 122, and/or the example shard access controller 132 of FIG. 1 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 1 may, thus, be instantiated at the same or different times. Some or all of the circuitry of FIG. 1 may be instantiated, for example, in one or more threads executing concurrently on hardware and/or in series on hardware. Moreover, in some examples, some or all of the circuitry of FIG. 1 may be implemented by microprocessor circuitry executing instructions and/or FPGA circuitry performing operations to implement one or more virtual machines and/or containers.

While an example manner of implementing the example network interface 114, the example namespace manager 116, the example shard partitioner 118, the example metadata generator 120, the example replicator 122, and the example shard access controller 132 is illustrated in FIG. 1, one or more of the elements, processes, and/or devices illustrated in FIG. 1 may be combined, divided, re-arranged, omitted, eliminated, and/or implemented in any other way. Further, the example network interface 114, the example namespace manager 116, the example shard partitioner 118, the example metadata generator 120, the example replicator 122, the example shard access controller 132, and/or, more generally, the example nodes 104a-e of FIG. 1, may be implemented by hardware alone or by hardware in combination with software and/or firmware. Thus, for example, any of the example network interface 114, the example namespace manager 116, the example shard partitioner 118, the example metadata generator 120, the example replicator 122, and the example shard access controller 132, and/or, more generally, the example nodes 104a-e, could be implemented by programmable circuitry in combination with machine-readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example network interface 114, the example namespace manager 116, the example shard partitioner 118, the example metadata generator 120, the example replicator 122, and the example shard access controller 132 of FIG. 1 may include one or more elements, processes, and/or devices in addition to, or instead of, those illustrated in FIG. 1, and/or may include more than one of any or all of the illustrated elements, processes and devices.

As described above, the example network interface 114, the example namespace manager 116, the example shard partitioner 118, the example metadata generator 120, the example replicator 122, and/or the example shard access controller 132 of FIG. 1 are structures. Such structures may implement means for performing corresponding disclosed functions. Examples of such functions are described above in connection with corresponding ones of the example network interface 114, the example namespace manager 116, the example shard partitioner 118, the example metadata generator 120, the example replicator 122, and/or the example shard access controller 132 and are described below in connection with the flowcharts of FIGS. 5A-5C.

Figure 2:
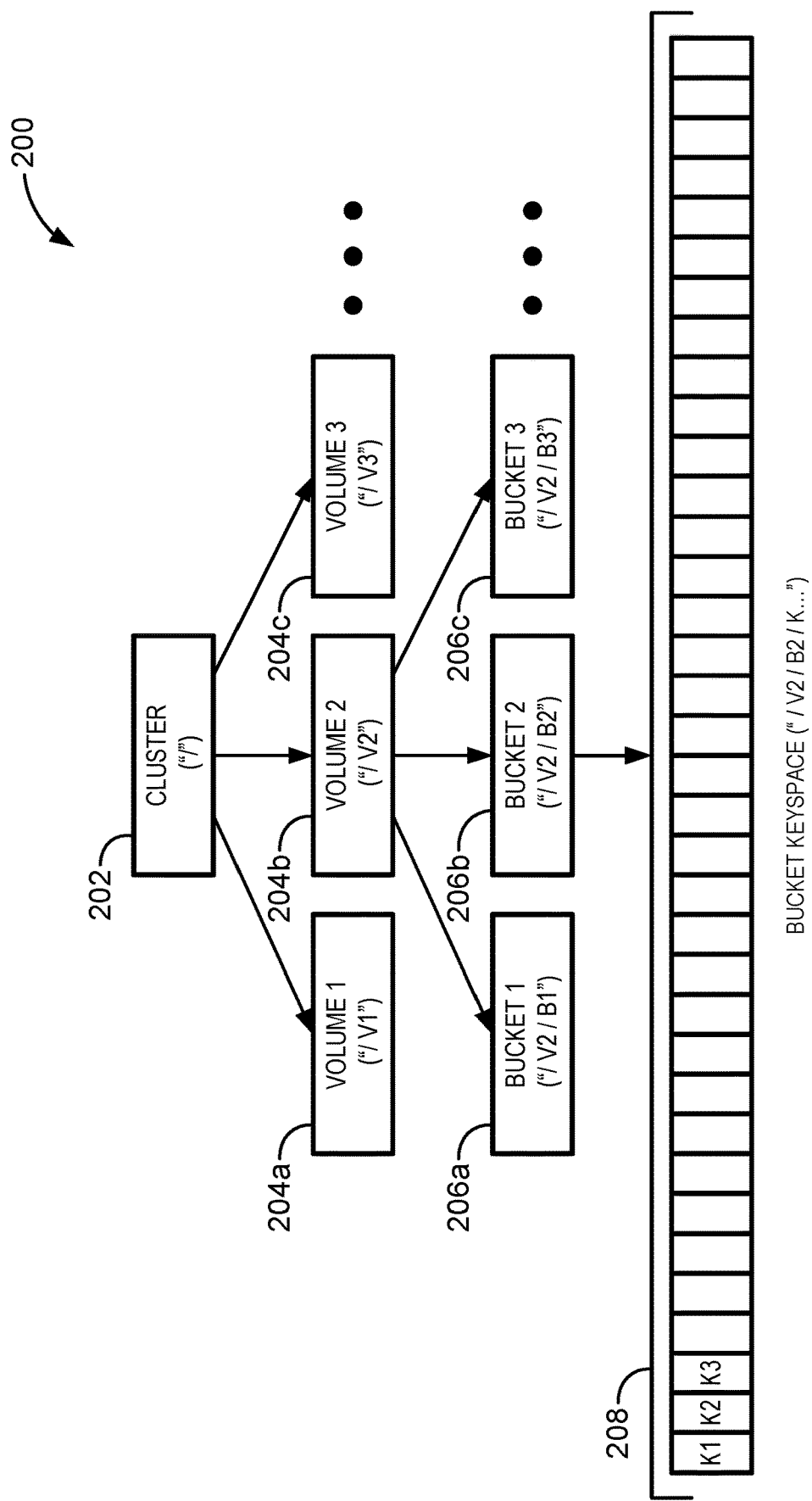
FIG. 2 is a block diagram of an example namespace tree to be stored in the example namespace management cluster of nodes of FIG. 1.

FIG. 2 is a block diagram of an example namespace tree 200 representing an organization of namespace metadata to be stored in the nodes 104a-e of the namespace management cluster consensus ring 102 of FIG. 1. The example namespace tree 200 is a cluster-wide namespace 202 that is organized into volumes 204a-c at a highest level. The example namespace root path for the cluster 202 is "/" and the example volume paths are "/V1" for the first volume 204a, "/V2" for the second volume 204b, and "/V3" for the third volume 204c. Each volume 204a-c includes multiple buckets. Example buckets 206a-c are shown as corresponding to volume 204b. The example bucket paths are "/V2/B1" for the first bucket 206a, "/V2/B2" for the second bucket 206b, and "/V2/B3" for the third bucket 206c. The example buckets 206a-c store paths and object names as namespace metadata. An array of example object names 208 is shown as corresponding to the bucket 206b. The example object names 208 are shown as keys K1, K2, and K3 and correspond to object key paths "/V2/B2/K1", "/V2/B2/K2", and "/V2/B2/K3". Additional keys may be used to represent object names of additional objects. An example use of a volume-level data arrangement is to use the example namespace tree 200 across cloud customers to, for example, onboard company A customer data to the first volume 204a ("/V1"), onboard company B customer data to the second volume 204b ("/V2"), and onboard company C customer data to the third volume 204b ("/V3"). Alternatively, a volume-level data arrangement may be used within a single organization's data (e.g., a company's data) to, for example, store data of a product management department in the first volume 204a ("/V1"), store data of an engineering department in the second volume 204b ("/V2"), and store data of an information technology (IT) department in the third volume 204b ("/V3"). In this manner, data of different organizations can be separated and isolated from one another in, for example, public and/or private cloud environments.

The example namespace manager 116 of FIG. 1 is configured to maintain up-to-date namespace metadata of objects represented in the namespace tree 200 and cross-shard metadata describing how the cluster, volumes, buckets, and objects of the namespace tree 200 are stored across multiple shards. For example, when objects are added, modified, and/or deleted, the namespace manager 116 may add, modify, and/or delete corresponding ones of the object names 208 in the namespace tree 200 and update corresponding namespace metadata and/or cross-shard metadata. In examples disclosed herein, cross-shard metadata can be stored in master shards (e.g., the master shards 304a, 306a, 308a of FIG. 3).

Figure 3:
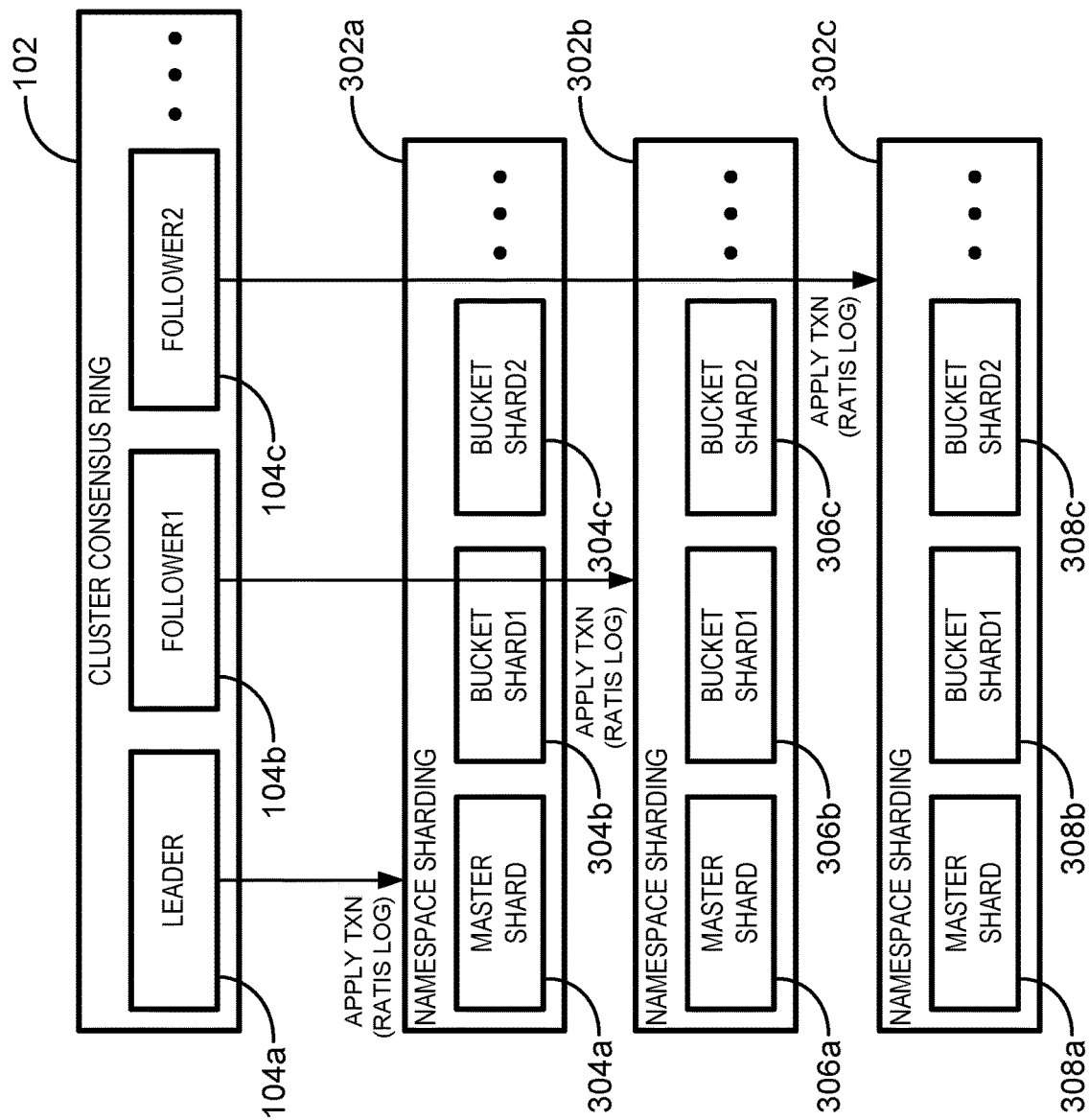
FIG. 3 is an example cluster consensus ring that may be implemented by the example namespace management cluster of nodes of FIG. 1 to store the example namespace tree of FIG. 2.

FIG. 3 is the example cluster consensus ring 102 of FIG. 1 that may be implemented to store the example namespace tree 200 of FIG. 2. The example cluster consensus ring 102 includes the example leader node 104a of FIG. 1, the example first follower node 104b of FIG. 1, and the example second follower node 104c of FIG. 1. Although the third follower node 104d and the fourth follower node 104e are not shown in FIG. 3, the example of FIG. 3 may be implemented with the third follower node 104d and the fourth follower node 104e. In example FIG. 3, the leader node 104a stores a first namespace sharding instance 302a, the first follower node 104b stores a second namespace sharding instance 302b, and the second follower node 104c stores a third namespace sharding instance 302c.

The example first namespace sharding instance 302a includes a master shard 304a, a first bucket shard 304b, and a second bucket shard 304c (e.g., database shards 304a-c). The example second namespace sharding instance 302b includes a master shard 306a, a first bucket shard 306b, and a second bucket shard 306c (e.g., database shards 306a-c). The example third namespace sharding instance 302c includes a master shard 308a, a first bucket shard 308b, and a second bucket shard 308c (e.g., database shards 308a-c). Although only three bucket shards 302a-c are shown per node 104a-c, each node 104a-c may include any number of bucket shards. Although only one master shard 304a, 306a, 308a is shown per namespace sharding instance 302a, 302b, 302c, in other examples, each namespace sharding instance 302a, 302b, 302c may have more than one master shard.

In the illustrated example, and referring to FIG. 1, the zeroth namespace database 126a of the zeroth local data store 124a may store the master shard 304a in the leader node 104a. Also in the leader node 104a of FIG. 1, the first namespace database 126b of the first local data store 124b may store the first bucket shard 304b, and the second namespace database 126c of the second local data store 124c may store the second bucket shard 304c. Turning to the first follower node 104b, the zeroth namespace database 136a of the zeroth local data store 134a of FIG. 1 may store the master shard 306a, the first namespace database 136b of the first local data store 134b of FIG. 1 may store the first bucket shard 306b, and the second namespace database 136c of the second local data store 134c of FIG. 1 may store the second bucket shard 306c. The second follower node 104c can similarly store ones of the bucket shards 308a-c in corresponding namespace databases of corresponding local data stores.

In example FIG. 3, the master shards 304a, 306a, 308a store cross-shard metadata that is not captured by others of the shards 304b-c, 306b-c, 308b-c but that is applicable or related to namespace data stored in those shards 304b-c, 306b-c, 308b-c. For example, the master shards 304a, 306a, 308a store cross-shard metadata generated by the metadata generator 120, as described above in connection with FIG. 1.

Figure 4:
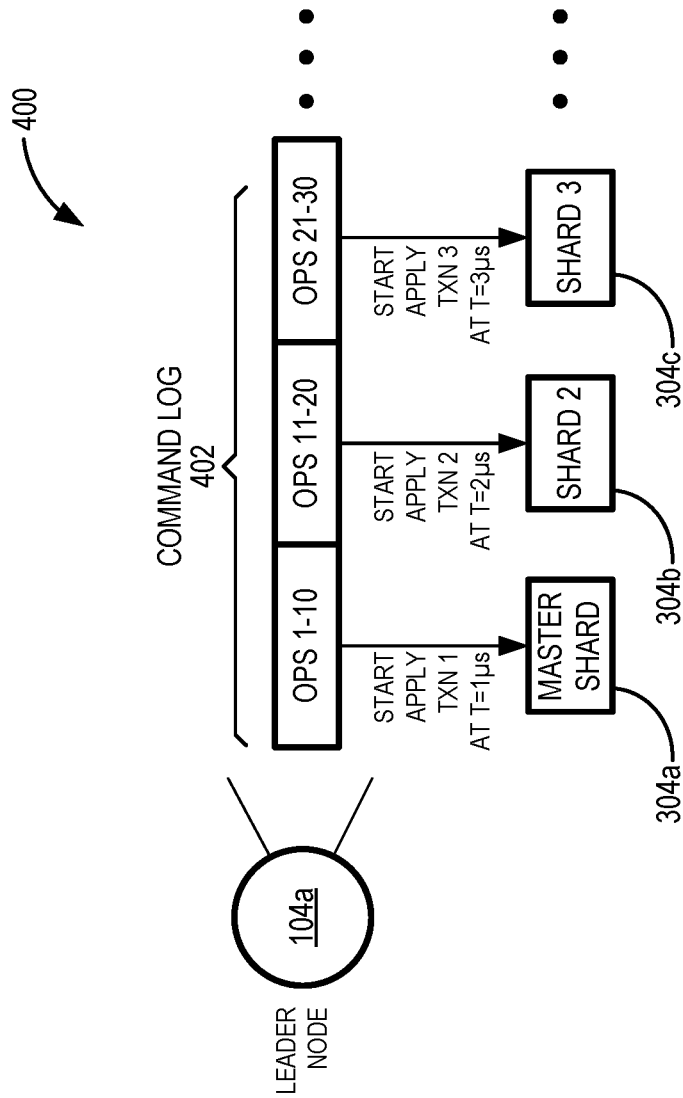
FIG. 4 is an example sequence of transactions performed by the example leader node of FIGS. 1 and 3 across a plurality of shards to store and/or update an object store namespace.

FIG. 4 is an example sequence of transactions 400 that are stored in a command log 402 and that are performed by the example leader node 104a (FIGS. 1 and 3) across a plurality of shards 304b-c to store and/or update an object store namespace. As shown in FIG. 4, using sharding in accordance with examples disclosed herein allows use of parallelism when namespace databases store and/or update namespace metadata. For example, in FIG. 4, the leader node 104a is to update an object store namespace by applying 30 commit transactions to a namespace storage space for 30 operations (e.g., OPS 1-10, OPS 11-20, OPS 21-30). In examples disclosed herein, operations (e.g., namespace operations) may be submitted by one or more client devices 106 (FIG. 1) to the consensus ring 102 to update namespace metadata. Example operations include file renames, directory renames, file moves, directory moves, links, etc. for corresponding objects (e.g., files, directories, resources, etc.). Assuming a transaction takes three microseconds to complete, performing the 30 transactions on a single database takes 90 microseconds based on the 30 transactions being performed in serial fashion. However, by sharding the object store namespace in accordance with examples disclosed herein, the amount of time to perform the 30 transactions can be significantly reduced. For example, the three shards 304a-c of FIG. 4 are implemented in three different databases (e.g., corresponding ones of the namespace databases 126b-d of FIG. 1) that can operate in parallel to apply three transactions concurrently. In this example, the leader node 104a starts the applying of a first transaction (TXN 1) (e.g., corresponding to operation 1) at T=1 microsecond (μs), starts the applying of a second transaction (TXN 2) (e.g., corresponding to operation 11) at T=2 microseconds (μs), and starts the applying of a third transaction (TXN 3) (e.g., corresponding to operation 21) at T=3 microseconds (μs). Assuming each transaction takes three microseconds to complete, the first, second, and third transactions are applied substantially in parallel in respective ones of the shards 304a-c so that completion of all three transactions takes five microseconds rather than nine microseconds under a purely serial approach that would apply the three transactions in seriatim in a single namespace database. To apply all 30 transactions across the three shards 304a-c using parallelism in accordance with teachings of this disclosure takes 50 microseconds to complete. This is a significant improvement over the 90 microseconds noted above if the 30 transactions were performed in serial fashion in a single namespace database.

Figure 5A:
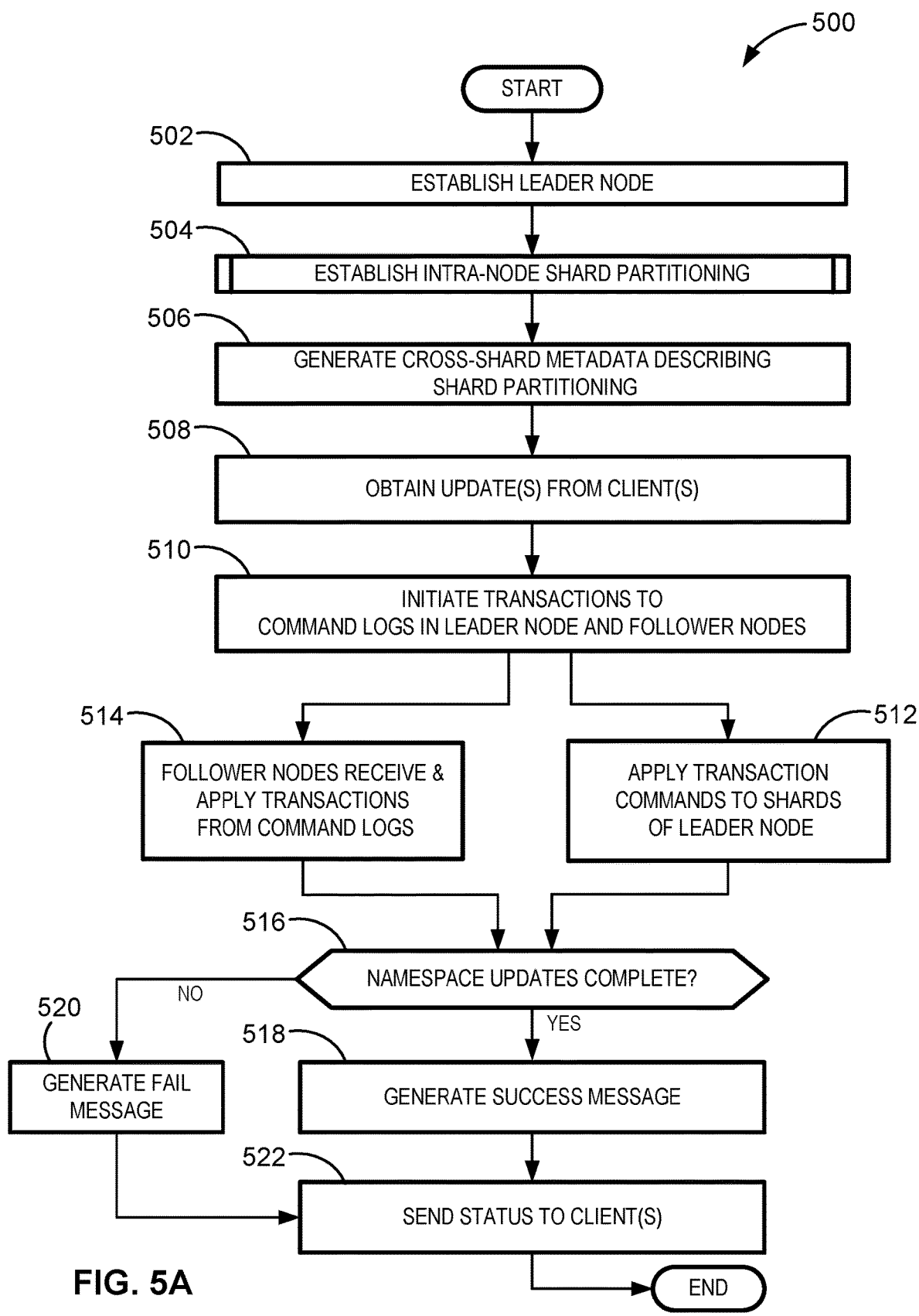
FIG. 5A is a flowchart representative of example machine-readable instructions and/or example operations that may be executed, instantiated, and/or performed by example programmable circuitry to implement the leader node of FIGS. 1 and 3 to update metadata in shards of the consensus ring of FIGS. 1 and 3.
Figure 5B:
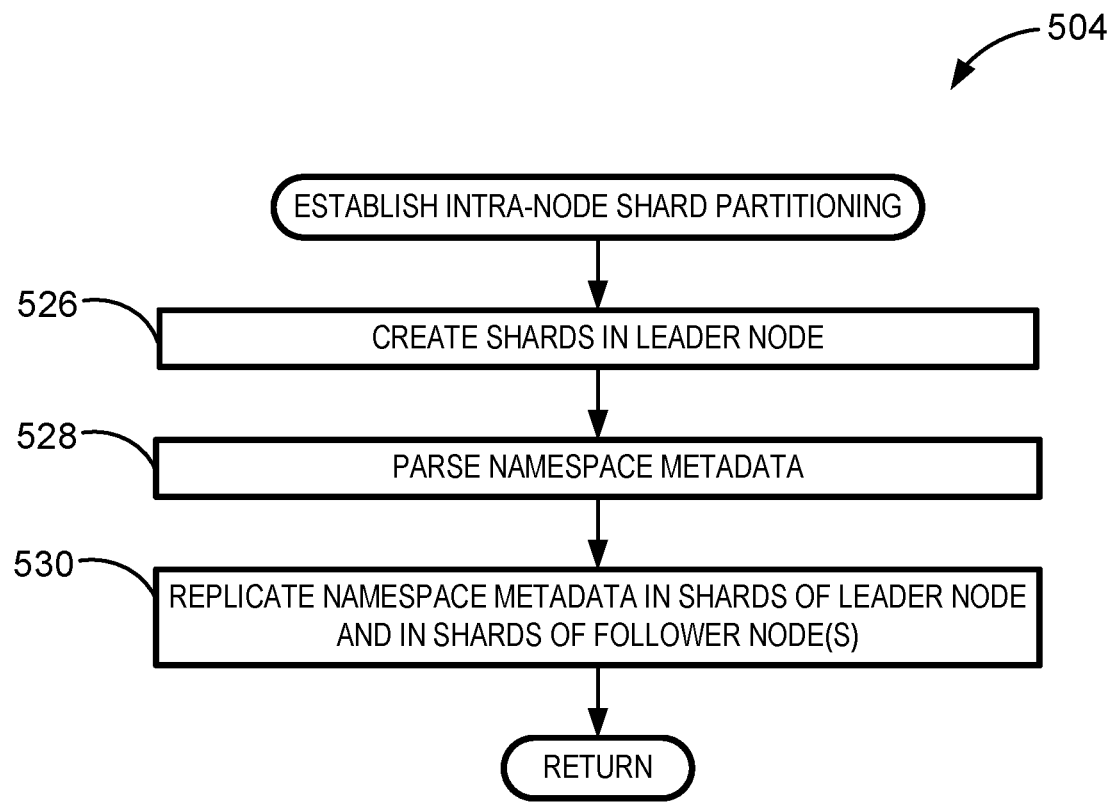
FIG. 5B is a flowchart representative of example machine-readable instructions and/or example operations that may be executed, instantiated, and/or performed by example programmable circuitry to implement the leader node of FIGS. 1 and 3 to establish intra-node shard partitioning.
Figure 5C:
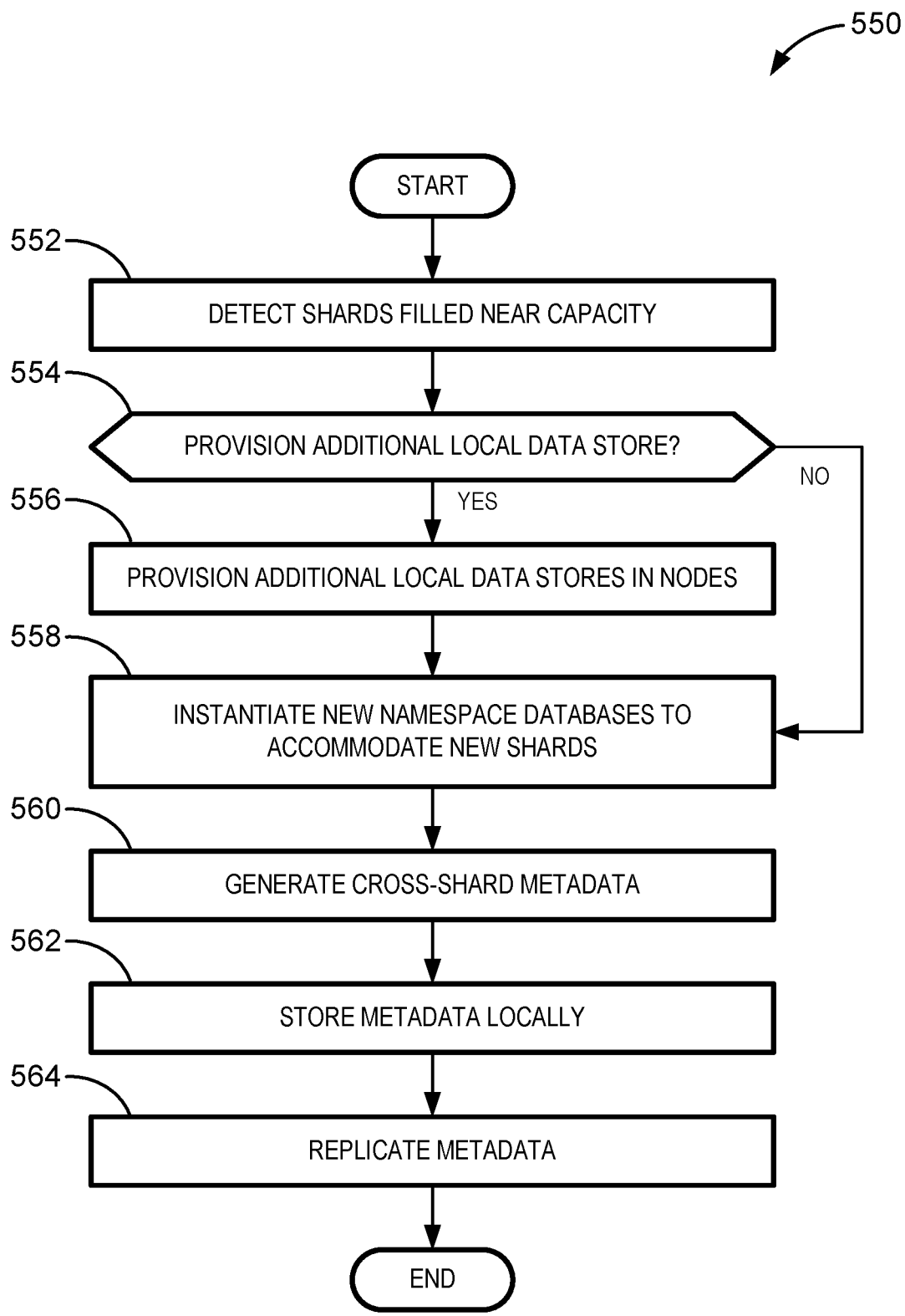
FIG. 5C is a flowchart representative of example machine-readable instructions and/or example operations that may be executed, instantiated, and/or performed by example programmable circuitry to implement the leader node of FIG. 1 to scale shards in the consensus ring of FIGS. 1 and 3.

Flowcharts representative of example machine-readable instructions, which may be executed by programmable circuitry to implement and/or instantiate the example namespace manager 116, the example shard partitioner 118, the example metadata generator 120, the example replicator 122, and/or the example shard access controller 132 of FIG. 1 and/or representative of example operations which may be performed by programmable circuitry to implement and/or instantiate the example namespace manager 116, the example shard partitioner 118, the example metadata generator 120, the example replicator 122, and/or the example shard access controller 132 of FIG. 1, are shown in FIGS. 5A, 5B, and 5C. The machine-readable instructions may be one or more executable programs or portion(s) of one or more executable programs for execution by programmable circuitry such as the programmable circuitry 612 shown in the example processor platform 600 discussed below in connection with FIG. 6 and/or may be one or more function(s) or portion(s) of functions to be performed by the example programmable circuitry (e.g., an FPGA) discussed below in connection with FIGS. 7 and/or 8. In some examples, the machine-readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer-readable and/or machine-readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer-readable and/or machine-readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine-readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer-readable storage medium may include one or more mediums. Further, although the example program is described with reference to the flowcharts illustrated in FIGS. 5A, 5B, and 5C, many other methods of implementing the example namespace manager 116, the example shard partitioner 118, the example metadata generator 120, the example replicator 122, and/or the example shard access controller 132 may alternatively be used. For example, the order of execution of the blocks of the flowcharts may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine-readable instructions described herein may be stored in one or more of a compressed format, an encrypted format, a fragmented format, a compiled format, an executable format, a packaged format, etc. Machine-readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine-readable instructions may be fragmented and stored on one or more storage devices, disks and/or computing devices (e.g., servers) located at the same or different locations of a network or collection of networks (e.g., in the cloud, in edge devices, etc.). The machine-readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine-readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine-readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, machine-readable, computer-readable and/or machine-readable media, as used herein, may include instructions and/or program(s) regardless of the particular format or state of the machine-readable instructions and/or program(s).

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 5A, 5B, and 5C may be implemented using executable instructions (e.g., computer-readable and/or machine-readable instructions) stored on one or more non-transitory computer-readable and/or machine-readable media. As used herein, the terms non-transitory computer-readable medium, non-transitory computer-readable storage medium, non-transitory machine-readable medium, and/or non-transitory machine-readable storage medium are expressly defined to include any type of computer-readable storage device and/or storage disk and to exclude propagating signals and to exclude transmission media. Examples of such non-transitory computer-readable medium, non-transitory computer-readable storage medium, non-transitory machine-readable medium, and/or non-transitory machine-readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer-readable storage device" and "non-transitory machine-readable storage device" are defined to include any physical (mechanical, magnetic and/or electrical) hardware to retain information for a time period, but to exclude propagating signals and to exclude transmission media. Examples of non-transitory computer-readable storage devices and/or non-transitory machine-readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer-readable instructions, machine-readable instructions, etc., and/or manufactured to execute computer-readable instructions, machine-readable instructions, etc.

FIG. 5A is a flowchart representative of example machine-readable instructions and/or example operations 500 that may be executed, instantiated, and/or performed by example programmable circuitry to implement the leader node 104a of FIGS. 1 and 3 to update metadata in shards of the consensus ring 102 of FIGS. 1 and 3. The example machine-readable instructions and/or the example operations 500 of FIG. 5A begin at block 502 at which the nodes 104a-e establish the node 104a as a leader node in accordance with a consensus ring protocol. For example, the leader node 104a may initiate a consensus voting scheme in the cluster consensus ring 102 (FIG. 1) after the example namespace manager 116 detects one or more namespace updates from the client devices 106 (FIG. 1).

At block 504, the example shard partitioner 118 (FIG. 1) establishes intra-node shard partitioning. For example, the shard partitioner 118 analyzes namespace metadata to be stored in multiple database shards in a single node in the cluster consensus ring 102. That is, the shard partitioner 118 establishes per-node shard partitions such that multiple shards created/established for a single node (e.g., intra-node shards) can be replicated across multiple nodes. Example instructions and/or operations that may be used to implement block 504 are described below in connection with FIG. 5B.

The example metadata generator 120 (FIG. 1) generates cross-shard metadata describing shard partitioning (block 506). For example, the metadata generator 120 generates the cross-shard metadata to describe how namespace metadata is stored across multiple shards in a node. The example namespace manager 116 obtains one or more update(s) from client device(s) (block 508). For example, the namespace manager 116 accesses one or more namespace updates received via one or more namespace operations from one or more of the client devices 106 (FIG. 1) during a client request phase. In the illustrated example, the namespace updates can be used by the metadata generator 120 to generate namespace metadata in accordance with the namespace tree 200 of FIG. 2 to represent updated namespace values in shards according to the one or more namespace operations.

At block 510, the example replicator 122 (FIG. 1) initiates transaction commands to command logs in the leader node 104a and the follower nodes 104b-e. That is, during an apply transaction phase, the example replicator 122 generates and/or adds the transaction commands to the command logs (e.g., the command log 402 of FIG. 4) of the nodes 104a-e. For example, the replicator 122 writes the transaction commands to the command log of the leader node 104a and causes transmission of the transaction commands to the command logs of the follower nodes 104b-e via the network interface 114 (FIG. 1). At block 512, the leader node 104a applies the transaction commands of its command log to one or more of its shards 304a-c (FIG. 3). For example, the shard access controller 132 of the leader node 104a drains its command log by executing the commands contained therein to update (e.g., write) namespace metadata and/or cross-shard metadata in one or more of the shards 304a-c. At block 514, the follower nodes 104b-e apply the transaction commands of their corresponding command logs across their shards (e.g., the shards 306a-c, 308a-c of FIG. 3). For example, the shard access controllers 132 of the follower nodes 104b-e drain their corresponding command logs by executing the commands contained therein to replicate (e.g., write) updated namespace metadata and/or cross-shard metadata across the shards 306a-c, 308a-c. Each of the follower nodes 104b-e returns a success message or a failure message to the leader node 104a based on whether it successfully applied all the transaction commands in its command log. In example FIG. 5A, the operations of blocks 510, 512, and 514 are performed atomically so that namespace updates are performed through completion or are not committed at all. In this manner, namespace updates are not inadvertently applied partially which could compromise the accuracy of the namespace.

The example namespace manager 116 determines whether the namespace updates are complete (block 516). For example, the namespace manager 116 determines that all namespace updates are complete when a quorum of success messages has been received from the follower nodes 104b-e. For example, a quorum is reached when at least two of the follower nodes 104b-e indicate that they have successfully applied all of the transaction commands in their corresponding command logs. In other examples, a quorum may be defined by any other quantity of success messages. If the namespace metadata updates are complete (block 516: YES), the example namespace manager 116 generates a success status message (block 518). If the namespace metadata updates are not complete (block 516: NO), the example namespace manager 116 generates a fail status message (block 520). The example namespace manager 116 sends a status message via the network interface 114 to the one or more client device(s) 106 that requested the namespace metadata updates. The example instructions and/or operations 500 of FIG. 5A end.

FIG. 5B is a flowchart representative of example machine-readable instructions and/or example operations 504 that may be executed, instantiated, and/or performed by example programmable circuitry to implement the leader node 104a of FIGS. 1 and 3 to establish intra-node shard partitioning. The example instructions and/or operations 504 implement block 504 of FIG. 5A. The example machine-readable instructions and/or the example operations 504 of FIG. 5B begin at block 526 at which the shard partitioner 118 creates multiple shards in the leader node 104a. The example shard partitioner 118 parses namespace metadata (block 528). For example, the shard partitioner 118 parses the namespace metadata to be distributed across the multiple shards (e.g., the shards 304b, 304c) in a single node (e.g., intra-node shards). The example shard partitioner 118 replicates the namespace metadata in the shards of the leader node 104a and across corresponding shards (e.g., shards 306b, 306c, 308b, 308c) in one or more of the follower nodes 104b-e (FIGS. 1 and 3) of the consensus ring 102 (block 530). For example, the shard partitioner 118 writes transaction commands in a command log of the leader node 104a and causes transmissions of transaction commands to one or more of the follower nodes 104b-e. This causes the namespace metadata to be written to the database shards of the leader node 104a and the one or more follower nodes 104b-e based on executions of the transaction commands in the command logs of the nodes 104a-e. In this manner, the same namespace metadata in the shards of the leader node 104a is replicated across the shards in each of the one or more follower nodes 104b-e. Control returns to the instructions and/or operations 500 of FIG. 5A.

FIG. 5C is a flowchart representative of example machine-readable instructions and/or example operations that may be executed, instantiated, and/or performed by example programmable circuitry to implement the leader node 104a of FIGS. 1 and 3 to scale shards in the consensus ring 102 of FIGS. 1 and 3. The example instructions and/or operations 550 of FIG. 5C may be executed before or after the example instructions and/or operations 500 of FIG. 5A. The example machine-readable instructions and/or the example operations 550 of FIG. 5C begin at block 552 at which the example namespace manager 116 (FIG. 1) detects shards are filled near capacity. For example, the example namespace manager 116 determines that the amount of metadata in the shards (e.g., the shards 304a-c, 306a-c, 308a-c of FIG. 3) satisfies a threshold capacity. For example, the threshold capacity may be selected by an administrator and/or a machine process to be a percentage (e.g., 80%, 90%, 100%, etc.) of available capacity in a shard.

The example namespace manager 116 determines whether to provision additional local data stores in the nodes 104a-e (block 554). For example, if a client device 106 identifies an additional object to be represented in the namespace, the client device 106 can provide a request to the consensus ring 102 of nodes 104a-e to represent the additional object in the namespace. If the existing local data stores 124a-d, 134a-d are insufficient to support an additional shard (e.g., an additional namespace database 126a-d, 136a-d) to accommodate the request, the namespace manager 116 determines to provision an additional local data store per node 104a-e. If the example namespace manager 116 determines to provision additional local data stores (block 554: YES), the namespace manager 116 provisions additional local data stores in the nodes 104a-e (block 556). For example, the namespace manager 116 may instantiate the additional local data stores by sending a request to a resource provisioning manager to provision the local data stores in the nodes 104a-e.

After provisioning the additional local data stores at block 556, or if the example namespace manager 116 determines to not provision additional local data stores (block 554: NO), the namespace manager 116 instantiates new namespace databases to accommodate new shards in the nodes 104a-e (block 558). For example, the namespace manager 116 may instantiate new namespace databases by sending a request to a resource provisioning manager to provision such namespace databases in the nodes 104a-e. Additionally or alternatively, the namespace manager 116 may instantiate the new namespace databases by causing transmissions of commands via the network interface 114 (FIG. 1) from the leader node 104a to command logs of the follower nodes 104b-e to cause the follower nodes 104b-e to instantiate corresponding namespace databases.

The example metadata generator 120 generates cross-shard metadata (block 560). For example, the metadata generator 120 generates cross-shard metadata to identify the new namespace databases in the nodes 104a-e as hosting new database shards (e.g., similar to the shards 304b-c, 306b-c, 308b-c of FIG. 3) and to describe how namespace metadata is to be organized in the newly created database shards.

The example metadata generator 120 stores the cross-shard metadata in a local master shard of the leader node 104a (block 562). For example, the metadata generator 120 stores the cross-shard metadata in the master shard 304a (FIGS. 1 and 2). The example replicator 122 replicates the cross-shard metadata to the follower nodes 104b-e (block 564). For example, the replicator 122 may cause transmissions of transaction commands via the network interface 114 (FIG. 1) from the leader node 104a to command logs of the follower nodes 104b-e to cause a shard access controller (e.g., the shard access controller 132 of FIG. 1) of the follower nodes 104b-e to apply cross-shard metadata update transactions in corresponding master shards (e.g., the master shards 306a, 308a) of the follower nodes 104b-e. The example instructions and/or operations 550 of FIG. 5C end.

Figure 6:
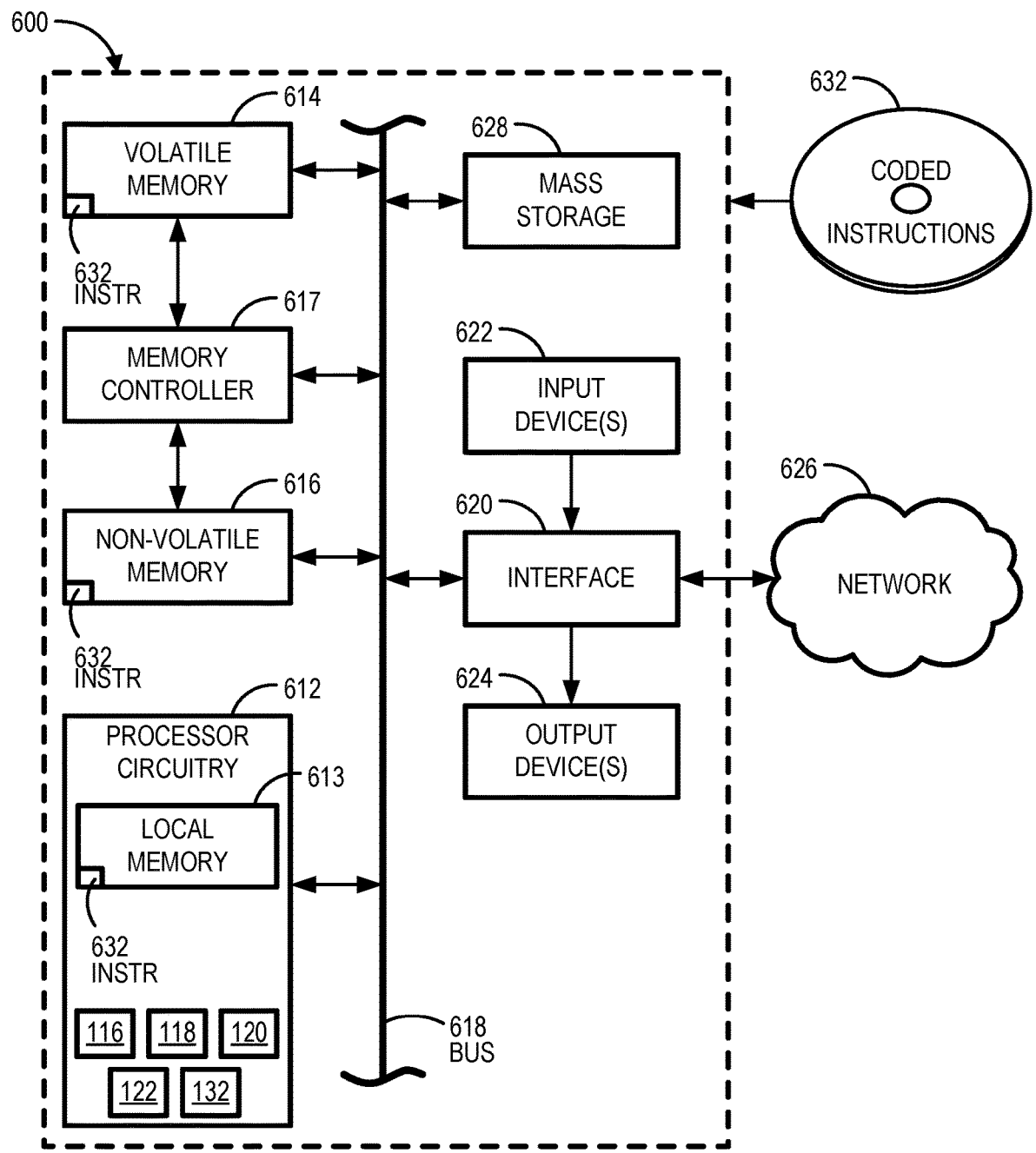
FIG. 6 is a block diagram of an example processing platform including programmable circuitry structured to execute, instantiate, and/or perform the example machine-readable instructions and/or perform the example operations of FIGS. 5A, 5B, and 5C to implement the nodes 104a-e of FIG. 1.

FIG. 6 is a block diagram of an example programmable circuitry platform 600 structured to execute and/or instantiate the example machine-readable instructions and/or the example operations of FIGS. 5A, 5B, and 5C to implement the example namespace manager 116, the example shard partitioner 118, the example metadata generator 120, the example replicator 122, and/or the example shard access controller 132 of FIG. 1. The programmable circuitry platform 600 can be, for example, a server, a personal computer, a workstation, a self-learning machine (e.g., a neural network), an Internet appliance, or any other type of computing and/or electronic device.

The programmable circuitry platform 600 of the illustrated example includes programmable circuitry 612. The programmable circuitry 612 of the illustrated example is hardware. For example, the programmable circuitry 612 can be implemented by one or more integrated circuits, logic circuits, FPGAs, microprocessors, CPUs, GPUs, DSPs, and/or microcontrollers from any desired family or manufacturer. The programmable circuitry 612 may be implemented by one or more semiconductor based (e.g., silicon based) devices. In this example, the programmable circuitry 612 implements the example namespace manager 116, the example shard partitioner 118, the example metadata generator 120, the example replicator 122, and the example shard access controller 132.

The programmable circuitry 612 of the illustrated example includes a local memory 613 (e.g., a cache, registers, etc.). The programmable circuitry 612 of the illustrated example is in communication with main memory 614, 616, which includes a volatile memory 614 and a non-volatile memory 616, by a bus 618. The volatile memory 614 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 616 may be implemented by flash memory and/or any other desired type of memory device. Access to the main memory 614, 616 of the illustrated example is controlled by a memory controller 617. In some examples, the memory controller 617 may be implemented by one or more integrated circuits, logic circuits, microcontrollers from any desired family or manufacturer, or any other type of circuitry to manage the flow of data going to and from the main memory 614, 616.

The programmable circuitry platform 600 of the illustrated example also includes interface circuitry 620. The interface circuitry 620 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 622 are connected to the interface circuitry 620. The input device(s) 622 permit(s) a user (e.g., a human user, a machine user, etc.) to enter data and/or commands into the programmable circuitry 612. The input device(s) 622 can be implemented by, for example, an audio sensor, a microphone, a camera (still or video), a keyboard, a button, a mouse, a touchscreen, a trackpad, a trackball, an isopoint device, and/or a voice recognition system.

One or more output devices 624 are also connected to the interface circuitry 620 of the illustrated example. The output device(s) 624 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 620 of the illustrated example, thus, typically includes a graphics driver card, a graphics driver chip, and/or graphics processor circuitry such as a GPU.

The interface circuitry 620 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 626. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc. The interface circuitry 620 implements the network interface 114 and/or the network interface 130 of FIG. 1.

The programmable circuitry platform 600 of the illustrated example also includes one or more mass storage discs or devices 628 to store firmware, software, and/or data. Examples of such mass storage discs or devices 628 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine-readable instructions 632, which may be implemented by the machine-readable instructions of FIGS. 5A, B, and 5C, may be stored in the mass storage device 628, in the volatile memory 614, in the non-volatile memory 616, and/or on at least one non-transitory computer-readable storage medium such as a CD or DVD which may be removable.

Figure 7:
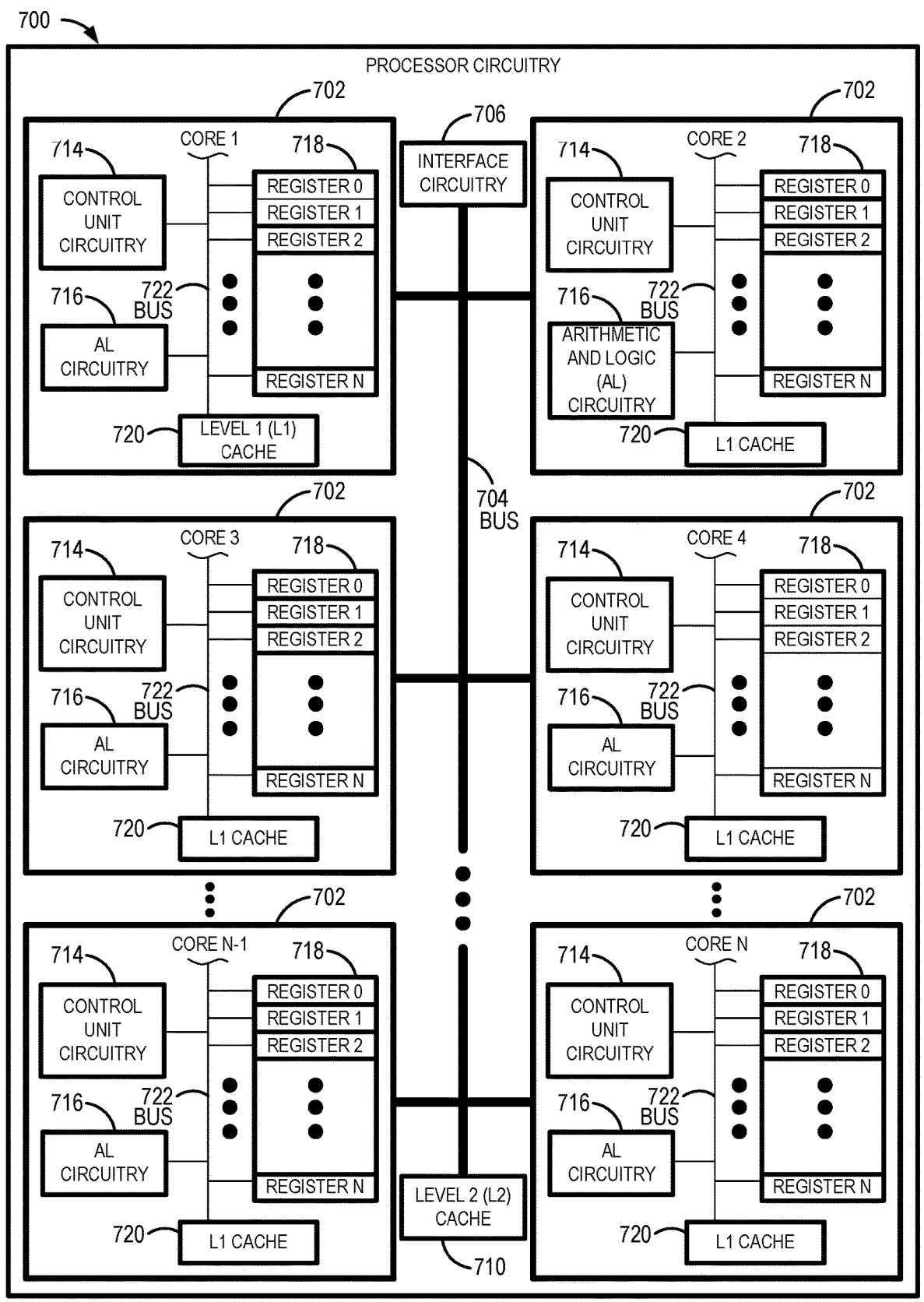
FIG. 7 is a block diagram of an example implementation of the programmable circuitry of FIG. 6.

FIG. 7 is a block diagram of an example implementation of the programmable circuitry 612 of FIG. 6. In this example, the programmable circuitry 612 of FIG. 6 is implemented by a microprocessor 700. For example, the microprocessor 700 may be a general-purpose microprocessor (e.g., general-purpose microprocessor circuitry). The microprocessor 700 executes some or all of the machine-readable instructions of the flowcharts of FIGS. 5A, 5B, and 5C to effectively instantiate the circuitry of FIG. 2 as logic circuits to perform operations corresponding to those machine-readable instructions. In some such examples, circuitry to implement the example namespace manager 116, the example shard partitioner 118, the example metadata generator 120, the example replicator 122, and/or the example shard access controller 132 of FIG. 1 is instantiated by the hardware circuits of the microprocessor 700 in combination with the machine-readable instructions. For example, the microprocessor 700 may be implemented by multi-core hardware circuitry such as a CPU, a DSP, a GPU, an XPU, etc. Although it may include any number of example cores 702 (e.g., 1 core), the microprocessor 700 of this example is a multi-core semiconductor device including N cores. The cores 702 of the microprocessor 700 may operate independently or may cooperate to execute machine-readable instructions. For example, machine code corresponding to a firmware program, an embedded software program, or a software program may be executed by one of the cores 702 or may be executed by multiple ones of the cores 702 at the same or different times. In some examples, the machine code corresponding to the firmware program, the embedded software program, or the software program is split into threads and executed in parallel by two or more of the cores 702. The software program may correspond to a portion or all of the machine-readable instructions and/or operations represented by the flowcharts of FIGS. 5A, 5B, and 5C.

The cores 702 may communicate by a first example bus 704. In some examples, the first bus 704 may be implemented by a communication bus to effectuate communication associated with one(s) of the cores 702. For example, the first bus 704 may be implemented by at least one of an Inter-Integrated Circuit (I2C) bus, a Serial Peripheral Interface (SPI) bus, a PCI bus, or a PCIe bus. Additionally or alternatively, the first bus 704 may be implemented by any other type of computing or electrical bus. The cores 702 may obtain data, instructions, and/or signals from one or more external devices by example interface circuitry 706. The cores 702 may output data, instructions, and/or signals to the one or more external devices by the interface circuitry 706. Although the cores 702 of this example include example local memory 720 (e.g., Level 1 (L1) cache that may be split into an L1 data cache and an L1 instruction cache), the microprocessor 700 also includes example shared memory 710 that may be shared by the cores (e.g., Level 2 (L2) cache)) for high-speed access to data and/or instructions. Data and/or instructions may be transferred (e.g., shared) by writing to and/or reading from the shared memory 710. The local memory 720 of each of the cores 702 and the shared memory 710 may be part of a hierarchy of storage devices including multiple levels of cache memory and the main memory (e.g., the main memory 614, 616 of FIG. 6). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 702 may be referred to as a CPU, DSP, GPU, etc., or any other type of hardware circuitry. Each core 702 includes control unit circuitry 714, arithmetic and logic (AL) circuitry (sometimes referred to as an ALU) 716, a plurality of registers 718, the local memory 720, and a second example bus 722. Other structures may be present. For example, each core 702 may include vector unit circuitry, single instruction multiple data (SIMD) unit circuitry, load/store unit (LSU) circuitry, branch/jump unit circuitry, floating-point unit (FPU) circuitry, etc. The control unit circuitry 714 includes semiconductor-based circuits structured to control (e.g., coordinate) data movement within the corresponding core 702. The AL circuitry 716 includes semiconductor-based circuits structured to perform one or more mathematic and/or logic operations on the data within the corresponding core 702. The AL circuitry 716 of some examples performs integer based operations. In other examples, the AL circuitry 716 also performs floating-point operations. In yet other examples, the AL circuitry 716 may include first AL circuitry that performs integer-based operations and second AL circuitry that performs floating-point operations. In some examples, the AL circuitry 716 may be referred to as an Arithmetic Logic Unit (ALU).

The registers 718 are semiconductor-based structures to store data and/or instructions such as results of one or more of the operations performed by the AL circuitry 716 of the corresponding core 702. For example, the registers 718 may include vector register(s), SIMD register(s), general-purpose register(s), flag register(s), segment register(s), machine-specific register(s), instruction pointer register(s), control register(s), debug register(s), memory management register(s), machine check register(s), etc. The registers 718 may be arranged in a bank as shown in FIG. 7. Alternatively, the registers 718 may be organized in any other arrangement, format, or structure, such as by being distributed throughout the core 702 to shorten access time. The second bus 722 may be implemented by at least one of an I2C bus, a SPI bus, a PCI bus, or a PCIe bus.

Each core 702 and/or, more generally, the microprocessor 700 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 700 is a semiconductor device fabricated to include many transistors interconnected to implement the structures described above in one or more integrated circuits (ICs) contained in one or more packages.

The microprocessor 700 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 700, in the same chip package as the microprocessor 700 and/or in one or more separate packages from the microprocessor 700.

Figure 8:
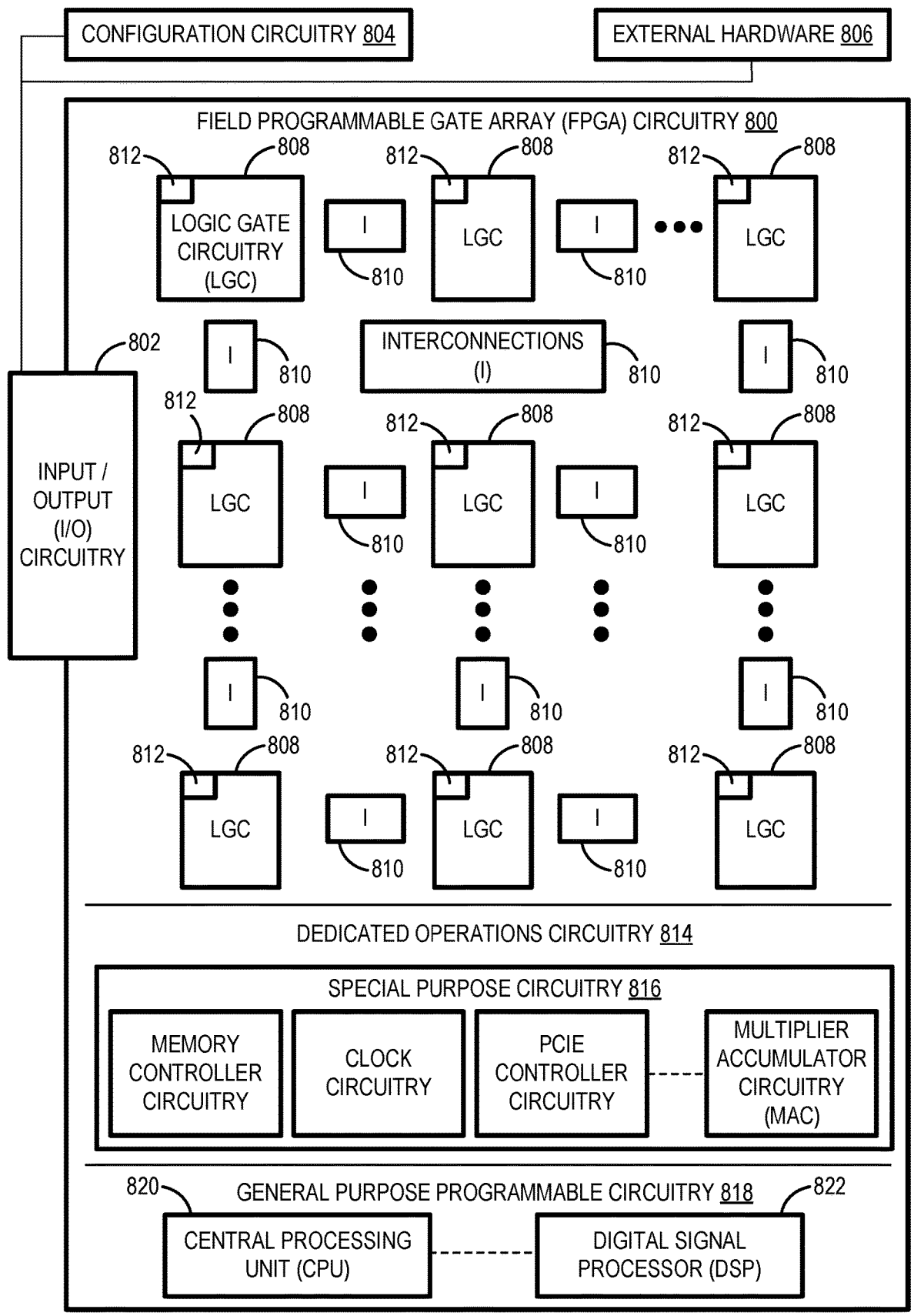
FIG. 8 is a block diagram of another example implementation of the programmable circuitry of FIG. 6.

FIG. 8 is a block diagram of another example implementation of the programmable circuitry 612 of FIG. 6. In this example, the programmable circuitry 612 is implemented by FPGA circuitry 800. For example, the FPGA circuitry 800 may be implemented by an FPGA. The FPGA circuitry 800 can be used, for example, to perform operations that could otherwise be performed by the example microprocessor 700 of FIG. 7 executing corresponding machine-readable instructions. However, once configured, the FPGA circuitry 800 instantiates the operations and/or functions corresponding to the machine-readable instructions in hardware and, thus, can often execute the operations/functions faster than they could be performed by a general-purpose microprocessor executing the corresponding software.

More specifically, in contrast to the microprocessor 700 of FIG. 7 described above (which is a general purpose device that may be programmed to execute some or all of the machine-readable instructions represented by the flowcharts of FIGS. 5A, 5B, and 5C but whose interconnections and logic circuitry are fixed once fabricated), the FPGA circuitry 800 of the example of FIG. 8 includes interconnections and logic circuitry that may be configured, structured, programmed, and/or interconnected in different ways after fabrication to instantiate, for example, some or all of the operations/functions corresponding to the machine-readable instructions represented by the flowcharts of FIGS. 5A, 5B, and 5C. In particular, the FPGA circuitry 800 may be thought of as an array of logic gates, interconnections, and switches. The switches can be programmed to change how the logic gates are interconnected by the interconnections, effectively forming one or more dedicated logic circuits (unless and until the FPGA circuitry 800 is reprogrammed). The configured logic circuits enable the logic gates to cooperate in different ways to perform different operations on data received by input circuitry. Those operations may correspond to some or all of the instructions (e.g., the software and/or firmware) represented by the flowcharts of FIGS. 5A, 5B, and 5C. As such, the FPGA circuitry 800 may be configured and/or structured to effectively instantiate some or all of the operations/functions corresponding to the machine-readable instructions of the flowcharts of FIGS. 5A, 5B, and 5C as dedicated logic circuits to perform the operations/functions corresponding to those software instructions in a dedicated manner analogous to an ASIC. Therefore, the FPGA circuitry 800 may perform the operations/functions corresponding to the some or all of the machine-readable instructions of FIGS. 5A, 5B, and 5C faster than the general-purpose microprocessor can execute the same.

In the example of FIG. 8, the FPGA circuitry 800 is configured and/or structured in response to being programmed (and/or reprogrammed one or more times) based on a binary file. In some examples, the binary file may be compiled and/or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 800 of FIG. 8 may access and/or load the binary file to cause the FPGA circuitry 800 of FIG. 8 to be configured and/or structured to perform the one or more operations/functions.

For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 800 of FIG. 8 to cause configuration and/or structuring of the FPGA circuitry 800 of FIG. 8, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 800 of FIG. 8 may access and/or load the binary file to cause the FPGA circuitry 800 of FIG. 8 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 800 of FIG. 8 to cause configuration and/or structuring of the FPGA circuitry 800 of FIG. 8, or portion(s) thereof.

The FPGA circuitry 800 of FIG. 8, includes example input/output (I/O) circuitry 802 to obtain and/or output data to/from example configuration circuitry 804 and/or external hardware 806. For example, the configuration circuitry 804 may be implemented by interface circuitry that may obtain a binary file, which may be implemented by a bit stream, data, and/or machine-readable instructions, to configure the FPGA circuitry 800, or portion(s) thereof. In some such examples, the configuration circuitry 804 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof). In some examples, the external hardware 806 may be implemented by external hardware circuitry. For example, the external hardware 806 may be implemented by the microprocessor 700 of FIG. 7.

The FPGA circuitry 800 also includes an array of example logic gate circuitry 808, a plurality of example configurable interconnections 810, and example storage circuitry 812. The logic gate circuitry 808 and the configurable interconnections 810 are configurable to instantiate one or more operations/functions that may correspond to at least some of the machine-readable instructions of FIGS. 5A, 5B, and 5C and/or other desired operations. The logic gate circuitry 808 shown in FIG. 8 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 808 to enable configuration of the electrical structures and/or the logic gates to form circuits to perform desired operations/functions. The logic gate circuitry 808 may include other electrical structures such as look-up tables (LUTs), registers (e.g., flip-flops or latches), multiplexers, etc.

The configurable interconnections 810 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 808 to program desired logic circuits.

The storage circuitry 812 of the illustrated example is structured to store result(s) of the one or more of the operations performed by corresponding logic gates. The storage circuitry 812 may be implemented by registers or the like. In the illustrated example, the storage circuitry 812 is distributed amongst the logic gate circuitry 808 to facilitate access and increase execution speed.

The example FPGA circuitry 800 of FIG. 8 also includes example dedicated operations circuitry 814. In this example, the dedicated operations circuitry 814 includes special purpose circuitry 816 that may be invoked to implement commonly used functions to avoid the need to program those functions in the field. Examples of such special purpose circuitry 816 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 800 may also include example general purpose programmable circuitry 818 such as an example CPU 820 and/or an example DSP 822. Other general purpose programmable circuitry 818 may additionally or alternatively be present such as a GPU, an XPU, etc., that can be programmed to perform other operations.

Although FIGS. 7 and 8 illustrate two example implementations of the programmable circuitry 612 of FIG. 6, many other approaches are contemplated. For example, FPGA circuitry may include an on-board CPU, such as one or more of the example CPU 820 of FIG. 7. Therefore, the programmable circuitry 612 of FIG. 6 may additionally be implemented by combining at least the example microprocessor 700 of FIG. 7 and the example FPGA circuitry 800 of FIG. 8. In some such hybrid examples, one or more cores 702 of FIG. 7 may execute a first portion of the machine-readable instructions represented by the flowcharts of FIGS. 5A, 5B, and 5C to perform first operation(s)/function(s), the FPGA circuitry 800 of FIG. 8 may be configured and/or structured to perform second operation(s)/function(s) corresponding to a second portion of the machine-readable instructions represented by the flowcharts of FIGS. 5A, 5B, and 5C, and/or an ASIC may be configured and/or structured to perform third operation(s)/function(s) corresponding to a third portion of the machine-readable instructions represented by the flowcharts of FIGS. 5A, 5B, and 5C.

It should be understood that some or all of the circuitry to implement the example namespace manager 116, the example shard partitioner 118, the example metadata generator 120, the example replicator 122, and/or the example shard access controller 132 of FIG. 1 may, thus, be instantiated at the same or different times. For example, same and/or different portion(s) of the microprocessor 700 of FIG. 7 may be programmed to execute portion(s) of machine-readable instructions at the same and/or different times. In some examples, same and/or different portion(s) of the FPGA circuitry 800 of FIG. 8 may be configured and/or structured to perform operations/functions corresponding to portion(s) of machine-readable instructions at the same and/or different times.

In some examples, some or all of the circuitry to implement the example namespace manager 116, the example shard partitioner 118, the example metadata generator 120, the example replicator 122, and/or the example shard access controller 132 of FIG. 1 may be instantiated, for example, in one or more threads executing concurrently and/or in series. For example, the microprocessor 700 of FIG. 7 may execute machine-readable instructions in one or more threads executing concurrently and/or in series. In some examples, the FPGA circuitry 800 of FIG. 8 may be configured and/or structured to carry out operations/functions concurrently and/or in series. Moreover, in some examples, some or all of the circuitry to implement the example namespace manager 116, the example shard partitioner 118, the example metadata generator 120, the example replicator 122, and/or the example shard access controller 132 of FIG. 1 may be implemented within one or more virtual machines and/or containers executing on the microprocessor 700 of FIG. 7.

In some examples, the programmable circuitry 612 of FIG. 6 may be in one or more packages. For example, the microprocessor 700 of FIG. 7 and/or the FPGA circuitry 800 of FIG. 8 may be in one or more packages. In some examples, an XPU may be implemented by the programmable circuitry 612 of FIG. 6, which may be in one or more packages. For example, the XPU may include a CPU (e.g., the microprocessor 700 of FIG. 7, the CPU 820 of FIG. 8, etc.) in one package, a DSP (e.g., the DSP 822 of FIG. 8) in another package, a GPU in yet another package, and an FPGA (e.g., the FPGA circuitry 800 of FIG. 8) in still yet another package.

Figure 9:
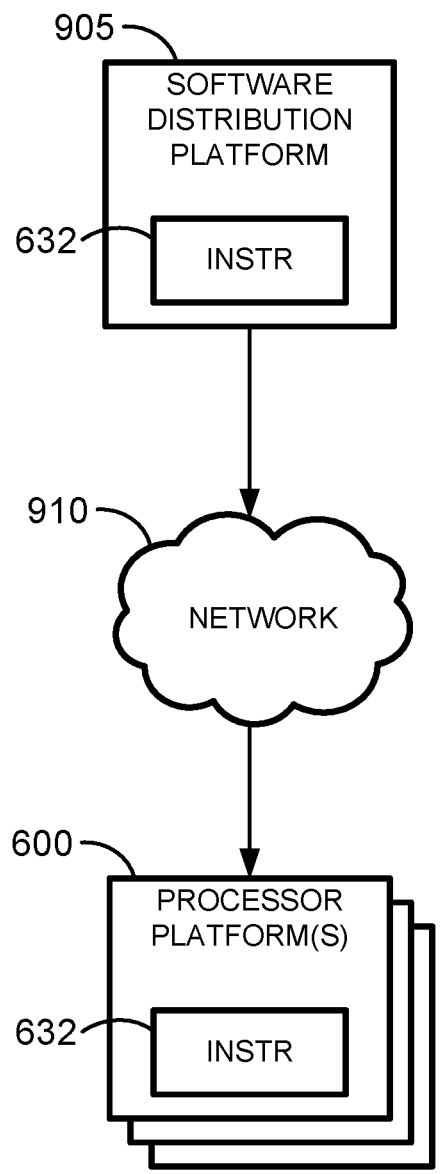
FIG. 9 is a block diagram of an example software/firmware/instructions distribution platform (e.g., one or more servers) to distribute software, instructions, and/or firmware (e.g., corresponding to the example machine-readable instructions of FIGS. 5A, 5B, and 5C) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 905 to distribute software such as the example machine-readable instructions 632 of FIG. 6 to other hardware devices (e.g., hardware devices owned and/or operated by third parties from the owner and/or operator of the software distribution platform) is illustrated in FIG. 9. The example software distribution platform 905 may be implemented by any computer server, data facility, cloud service, etc., capable of storing and transmitting software to other computing devices. The third parties may be customers of the entity owning and/or operating the software distribution platform 905. For example, the entity that owns and/or operates the software distribution platform 905 may be a developer, a seller, and/or a licensor of software such as the example machine-readable instructions 632 of FIG. 6. The third parties may be consumers, users, retailers, OEMs, etc., who purchase and/or license the software for use and/or re-sale and/or sub-licensing. In the illustrated example, the software distribution platform 905 includes one or more servers and one or more storage devices. The storage devices store the machine-readable instructions 632, which may correspond to the example machine-readable instructions of FIGS. 5A, 5B, and 5C, as described above. The one or more servers of the example software distribution platform 905 are in communication with an example network 910, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine-readable instructions 632 from the software distribution platform 905. For example, the software, which may correspond to the example machine-readable instructions of FIGS. 5A, 5B, and 5C, may be downloaded to the example programmable circuitry platform 600, which is to execute the machine-readable instructions 632 to implement the example namespace manager 116, the example shard partitioner 118, the example metadata generator 120, the example replicator 122, and/or the example shard access controller 132 of FIG. 1. In some examples, one or more servers of the software distribution platform 905 periodically offer, transmit, and/or force updates to the software (e.g., the example machine-readable instructions 632 of FIG. 6) to ensure improvements, patches, updates, etc., are distributed and applied to the software at the end user devices. Although referred to as software above, the distributed "software" could alternatively be firmware.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified herein.

As used herein "substantially real time" refers to occurrence in a near instantaneous manner recognizing there may be real world delays for computing time, transmission, etc. Thus, unless otherwise specified, "substantially real time" refers to real time+1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s)).

As used herein integrated circuit/circuitry is defined as one or more semiconductor packages containing one or more circuit elements such as transistors, capacitors, inductors, resistors, current paths, diodes, etc. For example, an integrated circuit may be implemented as one or more of an ASIC, an FPGA, a chip, a microchip, programmable circuitry, a semiconductor substrate coupling multiple circuit elements, a system on chip (SoC), etc.

From the foregoing, it will be appreciated that example systems, apparatus, articles of manufacture, and methods have been disclosed that organize an object store namespace. Disclosed systems, apparatus, articles of manufacture, and methods improve the efficiency of using a computing device by sharding namespace metadata into multiple database shards in each node across a consensus ring of nodes. In this manner, storage space to accommodate changing amounts of objects represented by namespace metadata can be more efficiently scaled up or scaled down by adding or removing database shards per node. For example, to scale up an object store namespace, one or more additional namespace databases can be provisioned in each node of a consensus ring to host one or more corresponding namespace database shards. Alternatively, to scale down the object store namespace, one or more namespace databases can be de-provisioned in each node of the consensus ring to stop hosting one or more corresponding namespace database shards. In addition, by using multiple shards per node in the consensus ring, transactions can be applied in parallel across multiple shards to decrease the amount of time needed to commit namespace metadata updates to the multiple shards. Disclosed systems, apparatus, articles of manufacture, and methods are accordingly directed to one or more improvement(s) in the operation of a machine such as a computer or other electronic and/or mechanical device.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An apparatus comprising:
    interface circuitry;
    machine-readable instructions; and
    programmable circuitry to at least one of instantiate or execute the machine-readable instructions to:
        create at least first and second database shards in a leader node, the leader node located in a consensus ring; and
        cause replication of first namespace metadata to the at least the first and second database shards of the leader node and to at least first and second database shards in corresponding ones of first and second namespace databases in a follower node, the follower node located in the consensus ring.

2. The apparatus of claim 1, comprising:
   determine that the at least the first and second database shards are filled to a threshold capacity;
   create a third database shard in the leader node and a third database shard in the follower node; and
   cause replication of second namespace metadata in the third database shard of the leader node and in the third database shard of the follower node.

3. The apparatus of claim 2, wherein the programmable circuitry is to create the third database shards in the leader node and in the follower node to scale up an object store namespace based on at least one additional object identified by a client device.

4. The apparatus of claim 1, wherein the programmable circuitry is to cause replication of cross-shard metadata in a master shard of the leader node and in a master shard of the follower node.

5. The apparatus of claim 4, wherein the cross-shard metadata includes volume information corresponding to volumes of the first namespace metadata stored in the at least the first and second database shards in the leader node.

6. The apparatus of claim 1, wherein the programmable circuitry is to cause the replication of the first namespace metadata to the at least the first and second database shards of the leader node and to the at least the first and second database shards in the follower node by writing the first namespace metadata to the leader node and the follower node in parallel.

7. The apparatus of claim 1, wherein the programmable circuitry is to cause the replication of the first namespace metadata to the at least the first and second database shards of the leader node and to the at least the first and second database shards in the follower node by causing transmission of transaction commands to command logs of the leader and follower nodes.

8. The apparatus of claim 1, wherein the programmable circuitry is to create a third database shard in the leader node to increase input/output operations (IOPS), the IOPS to execute transaction commands in a command log of the leader node.

9. A non-transitory computer-readable medium comprising instructions to cause programmable circuitry to at least:
   establish database shards for a leader node and a follower node of a consensus ring;
   generate cross-shard metadata, the cross-shard metadata to describe the database shards; and
   initiate transactions to command logs in the leader node and the follower node, the transactions to write namespace metadata and the cross-shard metadata in first ones of the database shards in the leader node and replicate the namespace metadata and the cross-shard metadata to second ones of the database shards in corresponding namespace databases in the follower node.

10. The non-transitory computer-readable medium of claim 9, wherein the instructions are to cause the programmable circuitry to:
    determine that the first ones of the database shards are filled to a threshold capacity;
    create an additional database shard in the leader node and an additional database shard in the follower node; and
    cause replication of second namespace metadata in the additional database shards of the leader node and the follower node.

11. The non-transitory computer-readable medium of claim 10, wherein the instructions are to cause the programmable circuitry to create the additional database shards in the leader node and in the follower node to scale up a namespace based on a client device requesting to represent at least one additional object in the namespace.

12. The non-transitory computer-readable medium of claim 9, wherein the instructions are to cause the programmable circuitry to cause replication of the cross-shard metadata in a master shard of the leader node and in a master shard of the follower node.

13. The non-transitory computer-readable medium of claim 12, wherein the cross-shard metadata includes volume information corresponding to volumes of the namespace metadata stored in the database shards of the leader node.

14. The non-transitory computer-readable medium of claim 9, wherein the instructions are to cause the programmable circuitry to initiate the transactions to the command logs by causing transmission of transaction commands to the command logs of the leader node and the follower node.

15. The non-transitory computer-readable medium of claim 9, wherein the instructions are to cause the programmable circuitry to create an additional database shard in the leader node to increase input/output operations (IOPS), the IOPS to execute transaction commands in the leader node.

16. A method comprising:
    creating at least first and second database shards in a leader node, the leader node located in a consensus ring; and
    causing replication of first namespace metadata across the at least the first and second database shards of the leader node and at least first and second database shards in corresponding ones of first and second namespace databases in a follower node, the follower node located in the consensus ring.

17. The method of claim 16, comprising:
    determining that the at least the first and second database shards are filled to a threshold capacity;
    creating a third database shard in the leader node and a third database shard in the follower node; and
    causing replication of second namespace metadata in the third database shard of the leader node and in the third database shard of the follower node.

18. The method of claim 17, wherein the creating of the third database shards in the leader node and in the follower node is to scale up a namespace based on a client device requesting to represent at least one additional object in the namespace.

19. The method of claim 16, including causing replication of cross-shard metadata in a master shard of the leader node and in a master shard of the follower node.

20. The method of claim 19, wherein the cross-shard metadata includes volume information corresponding to volumes of the first namespace metadata stored in the at least the first and second database shards in the leader node.

21. The method of claim 16, wherein the replication of the first namespace metadata across the at least the first and second database shards of the leader node and the at least the first and second database shards in the follower node is in parallel.

22. The method of claim 16, wherein the replication of the first namespace metadata across the at least the first and second database shards of the leader node and the at least the first and second database shards in the follower node is performed by causing transmission of transaction commands to command logs of the leader and follower nodes.

23. The method of claim 16, including creating a third database shard in the leader node to increase input/output operations (IOPS), the IOPS to execute transaction commands in a command log of the leader node.

\* \* \* \* \*